(12) United States Patent
Dye et al.

(10) Patent No.: US 10,200,587 B2
(45) Date of Patent: *Feb. 5, 2019

(54) REMOTE CAMERA USER INTERFACE

(71) Applicant: Apple Inc., Cupertino, CA (US)

(72) Inventors: Alan C. Dye, San Francisco, CA (US); Imran Chaudhri, San Francisco, CA (US); Christopher Patrick Foss, San Francisco, CA (US); Christopher Wilson, San Francisco, CA (US); Stephen O. Lemay, Palo Alto, CA (US); Gary Ian Butcher, San Jose, CA (US); Lawrence Y. Yang, Bellevue, WA (US); Chanaka G. Karunamuni, San Jose, CA (US); Natalia Maric, San Francisco, CA (US); Johnnie Manzari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,581

(22) Filed: May 9, 2018

(65) Prior Publication Data

US 2018/0262677 A1  Sep. 13, 2018

Related U.S. Application Data

(63) Continuation of application No. 15/268,115, filed on Sep. 16, 2016, now Pat. No. 9,973,674, which is a
(Continued)

(51) Int. Cl.
*G06F 3/01* (2006.01)
*G06F 3/041* (2006.01)
(Continued)

(52) U.S. Cl.
CPC ......... *H04N 5/23206* (2013.01); *G06F 3/017* (2013.01); *G06F 3/0416* (2013.01);
(Continued)

(58) Field of Classification Search
CPC ........... H04N 5/23206; H04N 5/23293; H04N 5/232; H04N 5/23203; H04N 5/4403;
(Continued)

(56) References Cited

U.S. PATENT DOCUMENTS 4,803,487 A   2/1989  Mukai et al.
5,557,358 A   9/1996  Allard et al.
(Continued)

FOREIGN PATENT DOCUMENTS

CN        1705346 A     12/2005
CN      101427574 A      5/2009
(Continued)

OTHER PUBLICATIONS

"3C Blogger Kisplay Share", Samsung Galaxy Tab S Hands-on SideSync 3.0 is Amazing, Jul. 4, 2014, 4 pages.
(Continued)

*Primary Examiner* — Pritham D Prabhakher
(74) *Attorney, Agent, or Firm* — Dentons US LLP

(57) ABSTRACT

At an electronic device with a touch-sensitive display, a remote camera control user interface may be displayed. In some examples, a user may provide input through a gesture at a location corresponding to the touch-sensitive display and/or through a rotation of a rotatable input mechanism to control a camera of an external device. Camera control may include control of the external device's camera features, including image capture, zoom settings, focus settings, flash settings, and timer settings, for example, and may also include access to the external device's library of previously captured images.

57 Claims, 20 Drawing Sheets

Related U.S. Application Data continuation of application No. 14/641,251, filed on Mar. 6, 2015, now Pat. No. 9,451,144.

(60) Provisional application No. 62/044,942, filed on Sep. 2, 2014.

(51) Int. Cl.
*H04N 5/232* (2006.01)
*G06F 3/0484* (2013.01)

(52) U.S. Cl.
CPC ....... *G06F 3/0484* (2013.01); *H04N 5/23216* (2013.01); *H04N 5/23293* (2013.01)

(58) Field of Classification Search
CPC ............. H04N 5/4405; H04N 5/44582; H04N 5/44586; H04N 1/00164; H04N 1/00233; H04N 1/32773; H04N 1/00381; H04N 2005/4423; H04N 2005/4425; H04N 7/185; H04N 7/183; H04N 21/4126; H04N 21/42204; H04N 21/42207; H04N 21/42208; H04N 21/42219; H04N 21/4222; H04N 21/42222; H04N 21/4223; H04N 21/4227; G06F 3/0416; G06F 3/0484; G06F 3/0488; G06F 3/0481; G06F 3/016; G06F 3/04842; G06F 3/0412; H04L 51/046; H04L 51/04; H04L 51/10; H04L 51/20; H04L 51/08; H04W 4/02; G06K 9/00335; G06K 9/00342; G06K 9/00355
USPC ........................................................ 348/211.2
See application file for complete search history.

(56) References Cited

U.S. PATENT DOCUMENTS

| | | | |
|---|---|---|---|
| 5,615,384 A | 3/1997 | Tuttle | |
| 5,617,031 A | 4/1997 | Gilboa | |
| 5,825,353 A | 10/1998 | Will | |
| 5,853,327 A | 12/1998 | Piernot et al. | |
| 6,167,353 A | 12/2000 | Lam | |
| 6,190,174 B1 | 2/2001 | Krull et al. | |
| 6,359,837 B1 * | 3/2002 | Tsukamoto | G03B 17/24 368/10 |
| 6,429,896 B1 * | 8/2002 | Aruga | H04N 5/77 348/231.99 |
| 6,522,347 B1 | 2/2003 | Sakai et al. | |
| 6,809,724 B1 | 10/2004 | Shiraishi et al. | |
| 6,809,759 B1 | 10/2004 | Chiang | |
| 6,819,867 B2 | 11/2004 | Mayer et al. | |
| 6,889,138 B1 | 5/2005 | Nicolas et al. | |
| 7,463,304 B2 | 12/2008 | Murray | |
| 7,551,899 B1 | 6/2009 | Doan et al. | |
| 7,843,471 B2 | 11/2010 | Saito | |
| 8,624,836 B1 | 1/2014 | Miller et al. | |
| 8,675,084 B2 | 3/2014 | Bolton et al. | |
| 8,742,890 B2 | 6/2014 | Gocho et al. | |
| 8,762,895 B2 * | 6/2014 | Mehta | G06F 3/04845 715/863 |
| 8,817,158 B2 | 8/2014 | Leyland et al. | |
| 8,894,462 B2 | 11/2014 | Zhou | |
| 9,172,866 B2 | 10/2015 | Ito et al. | |
| 9,185,291 B1 | 11/2015 | Shabtay et al. | |
| 9,360,671 B1 | 6/2016 | Yang et al. | |
| 9,405,766 B2 | 8/2016 | Robbin et al. | |
| 9,423,868 B2 * | 8/2016 | Iwasaki | G06F 3/005 |
| 9,451,144 B2 | 9/2016 | Dye | |
| 9,538,152 B2 | 1/2017 | Shabtay et al. | |
| 9,544,563 B1 | 1/2017 | Cheng et al. | |
| 9,547,419 B2 | 1/2017 | McGavran et al. | |
| 9,574,896 B2 | 2/2017 | Manzari et al. | |
| 9,628,950 B1 | 4/2017 | Noeth et al. | |
| 9,652,741 B2 | 5/2017 | Goldberg et al. | |
| 9,942,463 B2 * | 4/2018 | Kuo | H04N 5/23216 |
| 2002/0140803 A1 | 10/2002 | Gutta et al. | |
| 2002/0171737 A1 | 11/2002 | Tullis et al. | |
| 2003/0025802 A1 | 2/2003 | Mayer, Jr. et al. | |
| 2003/0128237 A1 | 7/2003 | Sakai | |
| 2003/0171984 A1 | 9/2003 | Wodka et al. | |
| 2004/0044953 A1 | 3/2004 | Watkins et al. | |
| 2004/0061796 A1 | 4/2004 | Honda et al. | |
| 2004/0095473 A1 | 5/2004 | Park | |
| 2004/0100389 A1 | 5/2004 | Naito et al. | |
| 2004/0189861 A1 | 9/2004 | Tom | |
| 2005/0117601 A1 | 6/2005 | Anderson et al. | |
| 2005/0134695 A1 | 6/2005 | Deshpande et al. | |
| 2005/0189419 A1 | 9/2005 | Igarashi et al. | |
| 2005/0237194 A1 | 10/2005 | Voba | |
| 2005/0237383 A1 | 10/2005 | Soga | |
| 2006/0026521 A1 | 2/2006 | Hotelling et al. | |
| 2006/0079973 A1 | 4/2006 | Bacharach | |
| 2006/0135064 A1 | 6/2006 | Cho et al. | |
| 2006/0187322 A1 | 8/2006 | Janson et al. | |
| 2006/0275025 A1 | 12/2006 | Labaziewicz et al. | |
| 2007/0025711 A1 | 2/2007 | Marcus et al. | |
| 2007/0025714 A1 | 2/2007 | Shiraki | |
| 2007/0096283 A1 | 5/2007 | Ljung et al. | |
| 2007/0097088 A1 | 5/2007 | Battles | |
| 2007/0109417 A1 | 5/2007 | Hyttfors et al. | |
| 2007/0140675 A1 | 6/2007 | Yanagi | |
| 2007/0165103 A1 | 7/2007 | Arima et al. | |
| 2007/0254640 A1 * | 11/2007 | Bliss | H04M 1/72533 455/420 |
| 2008/0077673 A1 | 3/2008 | Thomas | |
| 2008/0120029 A1 | 5/2008 | Zelek et al. | |
| 2008/0129759 A1 | 6/2008 | Jeon et al. | |
| 2008/0146275 A1 | 6/2008 | Tofflinger | |
| 2008/0165136 A1 | 7/2008 | Christie et al. | |
| 2008/0192020 A1 | 8/2008 | Kang et al. | |
| 2008/0214191 A1 | 9/2008 | Yach et al. | |
| 2008/0218611 A1 | 9/2008 | Parulski et al. | |
| 2008/0284855 A1 | 11/2008 | Umeyama et al. | |
| 2008/0297587 A1 | 12/2008 | Kurtz et al. | |
| 2009/0021600 A1 | 1/2009 | Watanabe | |
| 2009/0088207 A1 | 4/2009 | Sweeney et al. | |
| 2009/0102933 A1 | 4/2009 | Harris et al. | |
| 2009/0195402 A1 | 8/2009 | Izadi et al. | |
| 2009/0203315 A1 | 8/2009 | Kawabata et al. | |
| 2009/0207743 A1 | 8/2009 | Huq et al. | |
| 2009/0222748 A1 | 9/2009 | Lejeune et al. | |
| 2009/0315671 A1 | 12/2009 | Gocho et al. | |
| 2009/0325630 A1 | 12/2009 | Tiitola et al. | |
| 2010/0020221 A1 | 1/2010 | Tupman et al. | |
| 2010/0020222 A1 | 1/2010 | Jones et al. | |
| 2010/0026640 A1 | 2/2010 | Kim et al. | |
| 2010/0097322 A1 | 4/2010 | Hu et al. | |
| 2010/0138764 A1 | 6/2010 | Hatambeiki et al. | |
| 2010/0149090 A1 | 6/2010 | Morris et al. | |
| 2010/0232704 A1 | 9/2010 | Thorn | |
| 2010/0283743 A1 | 11/2010 | Coddington | |
| 2010/0287513 A1 | 11/2010 | Singh et al. | |
| 2010/0289825 A1 | 11/2010 | Shin et al. | |
| 2010/0289910 A1 | 11/2010 | Kamshilin et al. | |
| 2011/0008033 A1 | 1/2011 | Ichimiya | |
| 2011/0019058 A1 | 1/2011 | Sakai et al. | |
| 2011/0019655 A1 | 1/2011 | Hakola | |
| 2011/0058052 A1 | 3/2011 | Bolton et al. | |
| 2011/0059769 A1 | 3/2011 | Brunolli | |
| 2011/0074710 A1 | 3/2011 | Weeldreyer et al. | |
| 2011/0074830 A1 | 3/2011 | Rapp et al. | |
| 2011/0081860 A1 | 4/2011 | Brown et al. | |
| 2011/0085016 A1 | 4/2011 | Kristiansen et al. | |
| 2011/0115932 A1 * | 5/2011 | Shin | H04N 5/232 348/211.4 |
| 2011/0153628 A1 | 6/2011 | Basu et al. | |
| 2011/0234853 A1 | 9/2011 | Hayashi et al. | |
| 2012/0019400 A1 | 1/2012 | Patel et al. | |
| 2012/0057064 A1 | 3/2012 | Gardiner et al. | |
| 2012/0069206 A1 * | 3/2012 | Hsieh | H04N 1/00286 348/211.2 |
| 2012/0089300 A1 | 4/2012 | Wolterman | |

(56) References Cited

U.S. PATENT DOCUMENTS

| | | |
|---|---|---|
| 2012/0120277 A1 | 5/2012 | Tsai et al. |
| 2012/0169776 A1 | 7/2012 | Rissa et al. |
| 2012/0192094 A1 | 7/2012 | Goertz |
| 2012/0194559 A1 | 8/2012 | Lim |
| 2012/0198531 A1 | 8/2012 | Ort et al. |
| 2012/0236037 A1 | 9/2012 | Lessing et al. |
| 2012/0287290 A1 | 11/2012 | Jain |
| 2012/0316777 A1 | 12/2012 | Kitta |
| 2012/0320141 A1 | 12/2012 | Bowen et al. |
| 2013/0009858 A1 | 1/2013 | Lacey |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |
| 2013/0065482 A1 | 3/2013 | Trickett |
| 2013/0076591 A1 | 3/2013 | Sirpal et al. |
| 2013/0076908 A1 | 3/2013 | Bratton et al. |
| 2013/0093904 A1* | 4/2013 | Wagner ............... H04N 5/232 348/207.11 |
| 2013/0106603 A1 | 5/2013 | Weast et al. |
| 2013/0125016 A1 | 5/2013 | Pallakoff et al. |
| 2013/0134212 A1 | 5/2013 | Chang |
| 2013/0141325 A1 | 6/2013 | Bailey |
| 2013/0141331 A1 | 6/2013 | Shiu et al. |
| 2013/0141362 A1 | 6/2013 | Asanuma et al. |
| 2013/0166679 A1 | 6/2013 | Kuwahara |
| 2013/0201098 A1 | 8/2013 | Schilit et al. |
| 2013/0208136 A1 | 8/2013 | Takatsuka et al. |
| 2013/0219285 A1 | 8/2013 | Iwasaki |
| 2013/0219303 A1 | 8/2013 | Eriksson et al. |
| 2013/0265311 A1 | 10/2013 | Na et al. |
| 2013/0265467 A1 | 10/2013 | Matsuzawa et al. |
| 2013/0278576 A1 | 10/2013 | Lee et al. |
| 2013/0286251 A1 | 10/2013 | Wood et al. |
| 2013/0329074 A1 | 12/2013 | Zhang et al. |
| 2013/0339436 A1 | 12/2013 | Gray |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0015546 A1 | 1/2014 | Frederick |
| 2014/0022399 A1 | 1/2014 | Rashid et al. |
| 2014/0033100 A1 | 1/2014 | Noda et al. |
| 2014/0040831 A1 | 2/2014 | Akasaka et al. |
| 2014/0063313 A1 | 3/2014 | Choi et al. |
| 2014/0073252 A1 | 3/2014 | Lee et al. |
| 2014/0078371 A1 | 3/2014 | Kinoshita et al. |
| 2014/0084857 A1 | 3/2014 | Liu et al. |
| 2014/0099994 A1 | 4/2014 | Bishop et al. |
| 2014/0104449 A1 | 4/2014 | Masarik et al. |
| 2014/0118563 A1* | 5/2014 | Mehta ............... G06F 3/04845 348/207.1 |
| 2014/0132735 A1 | 5/2014 | Lee et al. |
| 2014/0142851 A1 | 5/2014 | Larmo et al. |
| 2014/0143678 A1* | 5/2014 | Mistry ............... G06F 3/017 715/746 |
| 2014/0143737 A1 | 5/2014 | Misty et al. |
| 2014/0160033 A1 | 6/2014 | Brikman et al. |
| 2014/0160231 A1 | 6/2014 | Middleton et al. |
| 2014/0160304 A1 | 6/2014 | Galor et al. |
| 2014/0167986 A1 | 6/2014 | Parada et al. |
| 2014/0173455 A1 | 6/2014 | Shimizu et al. |
| 2014/0180582 A1 | 6/2014 | Pontarelli et al. |
| 2014/0184524 A1 | 7/2014 | Schiefer et al. |
| 2014/0191715 A1 | 7/2014 | Wechlin et al. |
| 2014/0192233 A1 | 7/2014 | Kakkori et al. |
| 2014/0204229 A1 | 7/2014 | Leung et al. |
| 2014/0218599 A1 | 8/2014 | Nakamura et al. |
| 2014/0237389 A1 | 8/2014 | Ryall et al. |
| 2014/0310598 A1 | 10/2014 | Sprague et al. |
| 2014/0320387 A1 | 10/2014 | Eriksson et al. |
| 2014/0327639 A1 | 11/2014 | Papakipos et al. |
| 2014/0337450 A1 | 11/2014 | Choudhary et al. |
| 2014/0343843 A1 | 11/2014 | Yanku |
| 2014/0351753 A1 | 11/2014 | Shin et al. |
| 2014/0359481 A1 | 12/2014 | Dawson et al. |
| 2014/0365113 A1 | 12/2014 | Mcgavran et al. |
| 2014/0368719 A1 | 12/2014 | Gando et al. |
| 2014/0370807 A1 | 12/2014 | Lei et al. |
| 2015/0017956 A1 | 1/2015 | Jeong |
| 2015/0022674 A1 | 1/2015 | Koss et al. |
| 2015/0049233 A1 | 2/2015 | Choi |
| 2015/0061972 A1 | 3/2015 | Seo et al. |
| 2015/0065035 A1 | 3/2015 | Kim et al. |
| 2015/0067580 A1 | 3/2015 | Um et al. |
| 2015/0094031 A1 | 4/2015 | Liu |
| 2015/0131121 A1 | 5/2015 | Kang |
| 2015/0146079 A1 | 5/2015 | Kim |
| 2015/0150141 A1 | 5/2015 | Szymanski et al. |
| 2015/0181135 A1 | 6/2015 | Shimosato |
| 2015/0189162 A1* | 7/2015 | Kuo ............... H04N 5/23216 348/211.8 |
| 2015/0194050 A1 | 7/2015 | Lee |
| 2015/0264202 A1 | 9/2015 | Pawlowski |
| 2015/0297185 A1 | 10/2015 | Mccormack et al. |
| 2015/0350533 A1 | 12/2015 | Harris et al. |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0021168 A1 | 1/2016 | Chaudhri et al. |
| 2016/0043905 A1 | 2/2016 | Fiedler |
| 2016/0044236 A1 | 2/2016 | Matsuzawa et al. |
| 2016/0061613 A1 | 3/2016 | Jung et al. |
| 2016/0062572 A1 | 3/2016 | Yang et al. |
| 2016/0065827 A1 | 3/2016 | Dye et al. |
| 2016/0080657 A1 | 3/2016 | Chou et al. |
| 2016/0134737 A1 | 5/2016 | Pulletikurty |
| 2016/0173869 A1 | 6/2016 | Wang et al. |
| 2016/0241793 A1 | 8/2016 | Ravirala et al. |
| 2016/0259489 A1 | 9/2016 | Yang |
| 2016/0260414 A1 | 9/2016 | Yang |
| 2016/0316147 A1 | 10/2016 | Bernstein et al. |
| 2016/0373631 A1 | 12/2016 | Kocienda et al. |
| 2017/0006210 A1 | 1/2017 | Dye et al. |
| 2017/0011210 A1 | 1/2017 | Cheong et al. |
| 2017/0083188 A1 | 3/2017 | Yang et al. |
| 2017/0111567 A1 | 4/2017 | Pila |
| 2017/0160098 A1 | 6/2017 | Mcgavran et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2018/0131876 A1 | 5/2018 | Bernstein et al. |
| 2018/0146132 A1 | 5/2018 | Manzari et al. |

FOREIGN PATENT DOCUMENTS

| | | |
|---|---|---|
| CN | 103970208 A | 8/2014 |
| CN | 104024987 A | 9/2014 |
| CN | 104205785 A | 12/2014 |
| CN | 104272854 A | 1/2015 |
| CN | 104281430 A | 1/2015 |
| CN | 104346297 A | 2/2015 |
| EP | 836074 A2 | 4/1998 |
| EP | 1614992 A1 | 1/2006 |
| EP | 1858238 A2 | 11/2007 |
| EP | 1981262 A1 | 10/2008 |
| EP | 2096413 A1 | 9/2009 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2487613 A1 | 8/2012 |
| EP | 2523439 A1 | 11/2012 |
| EP | 2632131 A1 | 8/2013 |
| EP | 2640060 A1 | 9/2013 |
| EP | 2720442 A1 | 4/2014 |
| EP | 2950198 A1 | 12/2015 |
| JP | 11183183 A | 7/1999 |
| JP | 2014-53692 A | 3/2014 |
| JP | 2014-123169 A | 7/2014 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |

(56) References Cited

FOREIGN PATENT DOCUMENTS

| | | |
|---|---|---|
| WO | 2007/105937 A1 | 9/2007 |
| WO | 2010/102678 A1 | 9/2010 |
| WO | 2011/063516 A1 | 6/2011 |
| WO | 2012/172970 A1 | 12/2012 |
| WO | 2013/169849 A2 | 11/2013 |
| WO | 2013/169875 A2 | 11/2013 |
| WO | 2014/171734 A2 | 10/2014 |
| WO | 2015/112868 A1 | 7/2015 |
| WO | 2015/190666 A1 | 12/2015 |

OTHER PUBLICATIONS

"Axiang's Network Notebook", Deep Analysis on Samsung's 2013 New Flagship: tell you what kind of mobile phone Galaxy S4 is!, available at: https://axiang.cc/archives/6115, Apr. 22, 2013, 4 pages.
Corrected Notice of Allowance received for U.S. Appl. No. 15/268,115, dated Mar. 21, 2018, 9 pages.
Corrected Notice of Allowance received for U.S. Appl. No. 15/268,115, dated Apr. 13, 2018, 11 pages.
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
"DslrDashboard", Available online at: https://www.youtube.com/watch?v=DD4dCVinreU, 2013, 1 page.
Extended European Search Report (includes Supplementary European Search Report and Search Opinion) received for European Patent Application No. 17184710.6, dated Nov. 28, 2017, 10 pages.
Final Office Action received for U.S. Appl. No. 15/268,115, dated Oct. 11, 2017, 48 pages.
Fuji Film, "Taking Pictures Remotely: Free iPhone/Android App Fuji Film Camera Remote", Available at http://app.fujifilm-dsc.com/en/camera_remote/guide05.html, Apr. 22, 2014, 3 pages.
"GT-I9500(Galaxy S4) User Manual", Samsung, Rev.1.1, May 2013, 14 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for European Patent Application No. 15712218.5, dated Jan. 24, 2018, 7 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2015/041424, dated Feb. 2, 2017, 13 Pages.
International Search Report and Written Opinion received for PCT Patent Application No. PCT/US2015/019298, dated Jul. 13, 2015, 17 pages.
International Search Report and Written Opinion received for PCT Patent Application No. PCT/US2015/041424, dated Mar. 31, 2016, 18 pages.
Invitation to Pay Additional Fees received for PCT Patent Application No. PCT/US2015/041424, dated Nov. 12, 2015, 6 pages.
Non-Final Office Action received for U.S. Appl. No. 14/805,403, dated Nov. 16, 2017, 21 pages.
Non-Final Office Action received for U.S. Appl. No. 15/268,115, dated Apr. 13, 2017, 44 pages.
Notice of Allowance received for Taiwanese Patent Application No. 104107328, dated Jun. 12, 2017, 3 pages.
Notice of Allowance received for U.S. Appl. No. 14/641,251, dated Jun. 17, 2016, 2 pages.
Notice of Allowance received for U.S. Appl. No. 14/641,251, dated May 18, 2016, 13 pages.
Notice of Allowance received for U.S. Appl. No. 15/268,115, dated Mar. 7, 2018, 15 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for European Patent Application No. 15712218.5, dated Aug. 3, 2017, 4 pages.
Office Action received for Taiwanese Patent Application No. 104107328, dated Dec. 28, 2016, 4 pages.
Office Action received for Taiwanese Patent Application No. 104123593, dated May 24, 2016, 57 pages.
Office Action received for Taiwanese Patent Application No. 104123593, dated Sep. 13, 2016, 8 pages.
"PlayMemories Camera Apps Help Guide", available at https://www.playmemoriescameraapps.com/portal/manual/IS9104-NPIA09014_00-F00002/en/index.html, 2012, 3 pages.
"Remote Shot for SmartWatch 2", Android Apps on Google Play, Nov. 21, 2017, 3 pages.
TechSmith, "Snagit® 11 Snagit 11.4 Help", available at http://assets.techsmith.com/Downloads/ua-tutorials-snagit-11/Snagit_11.pdf, Jan. 2014, 146 pages.
Xiao, et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at http://www.xperiablog.net/2014/06/13/action-camera-extension-gives-smartwatchsmartband-owners-ability-to-control-sony-wireless-cameras/, Jun. 13, 2014, 10 pages.
Notice of Allowance received for Chinese Patent Application No. 201580046237.6, dated Aug. 29, 2018, 4 pages (1 page of English Translation and 3 pages of Official copy).
Notice of Allowance received for U.S. Appl. No. 15/858,175, dated Sep. 12, 2018, 8 pages.
Office Action received for Australian Patent Application No. 2016218318, dated Aug. 24, 2018, 5 pages.
Certificate of Examination received for Australian Patent Application No. 2017100683, dated Jan. 16, 2018, 2 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Decision to Grant received for Danish Patent Application No. PA201570664, dated Feb. 20, 2017, 2 pages.
Decision to Grant received for European Patent Application No. 15712218.5, dated Jun. 7, 2018, 2 pages.
Extended European Search Report received for European Patent Application No. 16784025.5, dated Apr. 16, 2018, 11 pages.
Final Office Action received for U.S. Appl. No. 14/839,897, dated Jan. 10, 2018, 16 pages.
Intention to Grant received for Danish Patent Application No. PA201570773, dated Mar. 9, 2018, 2 pages.
International Preliminary Report on Patentability and Written Opinion received for PCT Application No. PCT/US2016/029030, dated Nov. 2, 2017, 35 pages.
International Preliminary Report on Patentability received for PCT Patent Application No. PCT/US2015/047507, dated Mar. 16, 2017, 16 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/016621, dated Aug. 24, 2017, 8 pages.

(56) References Cited

OTHER PUBLICATIONS

International Search Report and Written Opinion received for PCT Patent Application No. PCT/US2016/029030, dated Aug. 5, 2016, 37 pages.
International Search Report and Written Opinion received for PCT Patent Application No. PCT/US2016/016621, dated May 9, 2016, 12 pages.
International Search Report and Written Opinion received for PCT Patent Application No. PCT/US2017/035321, dated Oct. 6, 2017, 15 pages.
Invitation to Pay Addition Fees received for PCT Patent Application No. PCT/US2017/035321, dated Aug. 17, 2017, 3 pages.
"iPhone User Guide for iOS 4.2 and 4.3 Software", Available at https://manuals.info.apple.com/MANUALS/1000/MA1539/en_US/iPhone_iOS4_User_Guide.pdf, 2011, 274 pages.
Non-Final Office Action received for U.S. Appl. No. 14/839,997, dated May 18, 2017, 11 pages.
Non-Final Office Action received for U.S. Appl. No. 14/839,903, dated Feb. 26, 2018, 10 pages.
Non-Final Office Action received for U.S. Appl. No. 14/839,913, dated Jul. 28, 2016, 12 pages.
Non-Final Office Action received for U.S. Appl. No. 14/864,011, dated Jun. 10, 2016, 10 pages.
Non-Final Office Action received for U.S. Appl. No. 14/869,807, dated Dec. 2, 2016, 23 pages.
Non-Final Office Action received for U.S. Appl. No. 15/136,323, dated Apr. 6, 2017, 27 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/433,238, dated Nov. 3. 2017, 6 pages.
Non-Final Office Action received for U.S. Appl. No. 15/863,369, dated Apr. 4, 2018, 15 pages.
Notice of Acceptance received for Australian Patent Application No. 2016252993, dated Dec. 19, 2017, 3 pages.
Notice of Allowance received for Danish Patent Application No. PA201570771, dated Sep. 2, 2016, 2 pages.
Notice of Allowance received for Danish Patent Application No. PA201570773, dated Apr. 26, 2018, 2 pages.
Notice of Allowance received for Taiwanese Patent Application No. 104128700, dated Mar. 27, 2017, 3 pages (Official Copy only) (see attached 37 CFR § 1.98(a) (3)).
Notice of Allowance received for Taiwanese Patent Application No. 104133756, dated Nov. 30, 2017, 5 pages (2 pages of English Translation and 3 pages of Official Copy).
Notice of Allowance received for Taiwanese Patent Application No. 104133757, dated Jan. 18, 2017, 3 pages (Official Copy only) (see attached 37 CFR § 1.98(a) (3)).
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/136,323, dated Feb. 28, 2018, 9 pages.
Notice of Allowance received for U.S. Appl. No. 15/136,323, dated Oct. 12, 2017, 8 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/433,238, dated May 17, 2018, 7 pages.
Office Action received for Australian Patent Application No. 2015385757, dated Sep. 11, 2017, 3 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action received for Chinese Patent Application No. 201580046237.6, dated Feb. 6, 2018, 10 pages (5 pages of English Translation and 5 pages of Official Copy).
Office Action received for Chinese Patent Application No. 201620119869.2, dated Jun. 3, 2016, 2 pages (1 page of English Translation and 1 page of Official copy).
Office Action received for Chinese Patent Application No. 201620119869.2, dated Nov. 22, 2016, 2 pages (Official Copy only) (see attached 37 CFR § 1.98(a)(3)).
Office Action received for Danish Patent Application No. PA201570664, dated Dec. 14, 2016, 2 pages.
Office Action received for Danish Patent Application No. PA201570664, dated Jun. 3, 2016, 3 pages.
Office Action received for Danish Patent Application No. PA201570771, dated Jun. 13, 2016, 3 pages.
Office Action received for Danish Patent Application No. PA201570773, dated Aug. 28, 2017, 3 pages.
Office Action received for Danish Patent Application No. PA201570773, dated Feb. 15, 2017, 3 pages.
Office Action received for Danish Patent Application No. PA201570773, dated Sep. 12, 2016, 3 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Japanese Patent Application No. 2017-545733, dated Feb. 13, 2018, 7 pages (3 pages of English Translation and 4 pages of Official Copy).
Office Action received for Taiwanese Patent Application No. 104128700, dated Aug. 31, 2016, 13 pages (6 pages of English Translation and 7 pages of Official Copy).
Office Action received for Taiwanese Patent Application No. 104133756, dated May 17, 2017, 13 pages (6 pages of English Translation and 7 pages of Official Copy).

(56) References Cited

OTHER PUBLICATIONS

Office Action received for Taiwanese Patent Application No. 104133757, dated Jul. 6, 2016, 22 pages (9 pages of English Translation and 13 pages of Official Copy).
Supplemental Notice of Allowance received for U.S. Appl. No. 15/136,323, dated Jan. 31, 2018, 6 pages.
Non-Final Office Action received for U.S. Appl. No. 12/508,534, dated Dec. 30, 2011, 11 pages.
Non Final Office Action received for U.S. Appl. No. 14/839,913, dated Mar. 2, 2016, 11 pages.
Non Final Office Action received for U.S. Appl. No. 14/864,011, dated Jan. 21, 2016, 10 pages.
Office Action received for Australian Patent Application No. 2016100155, dated May 4, 2016, 7 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
AT&T, "Pantech C3b User Guide", AT&T, Feb. 10, 2007, 97 pages.
Office Action received for Danish Patent Application No. PA201570664, dated Mar. 15, 2016, 10 pages.
Office Action received for Danish Patent Application No. PA201570771, dated Mar. 17, 2016, 8 pages.
Office Action Received for Danish Patent Application No. PA201570773, dated Mar. 18, 2016, 9 pages.
Office Action received for Danish Patent Application No. PA201670074, dated Apr. 7, 2016, 8 pages.
International Search Report and Written Opinion received for PCT Application No. PCT/US2015/047507, dated Feb. 22, 2016, 22 pages.
Invitation to Pay Additional Fees received for PCT Patent Application No. PCT/US2015/047507, dated Jan. 4, 2016, 8 pages.
International Search Report and Written Opinion received for PCT Patent Application No. PCT/US2015/055165, dated Apr. 20, 2016, 22 pages.
Invitation to Pay Additional Fees received for PCT Patent Application No. PCT/US2015/055165, dated Jan. 18, 2016, 6 pages.
Peters, "Long-Awaited iPhone Goes on Sale", nytimes.com, Jun. 29, 2007, 3 pages.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Supplemental Notice of Allowance received for U.S. Appl. No. 15/863,369, dated Aug. 8, 2018, 4 pages.
Intention to Grant received for Danish Patent Application No. PA201670627, dated Jun. 11, 2018, 2 pages.
Notice of Allowance received for Japanese Patent Application No. 2017-545733, dated Jun. 1, 2018, 4 pages (1 page of English Translation and 3 pages of Official copy).
Notice of Allowance received for U.S. Appl. No. 14/839,897, dated Jun. 8, 2018, 11 pages.
Notice of Allowance received for U.S. Appl. No. 15/858,175, dated Jun. 1, 2018, 8 pages.
Supplemental Notice of Allowance received for U.S. Appl. No. 15/433,238, dated Jun. 20, 2018, 2 pages.
Extended Search Report received for European Patent Application 17809168.2, dated Jun. 28, 2018, 9 pages.
Notice of Allowance received for U.S. Appl. No. 15/863,369, dated Jun. 28, 2018, 8 pages.
Office Action received for Chinese Patent Application No. 201610084974.1, dated May 3, 2018, 12 pages (5 pages of English Translation and 7 pages of Official Copy).
Notice of Acceptance received for Australian Patent Application No. 2015385757, dated Jul. 16, 2018, 3 pages.
Notice of Allowance received for U.S. Appl. No. 14/805,403, dated Jul. 11, 2018, 15 pages.

\* cited by examiner

REMOTE CAMERA USER INTERFACE

CROSS-REFERENCE TO RELATED APPLICATIONS

This application is a continuation of U.S. patent application Ser. No. 15/268,115, titled "Remote Camera User Interface," filed Sep. 16, 2016, which is a continuation of U.S. patent application Ser. No. 14/641,251, titled "Remote Camera User Interface," filed Mar. 6, 2015 and issued as U.S. Pat. No. 9,451,144, which claims priority to U.S. Provisional Application Ser. No. 62/044,942, titled "Remote Camera User Interface", filed Sep. 2, 2014, the contents of which are hereby incorporated by reference in their entireties.

FIELD

The present disclosure relates generally to computer user interfaces, and more specifically to techniques for providing remote camera control on an electronic device.

BACKGROUND

Cameras, no longer limited to dedicated electronic devices, are typically within hands reach at all times. A camera may be conveniently included in any of a variety of portable electronic devices, including smartphones, tablet computers, and laptop computers, reducing the number of separate devices carried by a user.

BRIEF SUMMARY

Whether for use with separate digital cameras or electronic devices with integrated cameras, camera operators are faced with a problem: exclusion from their own captured images. Dedicated remote camera control devices are available, but in contrast to the convenience of including a camera in portable electronic devices, a dedicated remote camera control is typically a large additional item for a user to carry.

In some embodiments, a method comprises: at an electronic device with a touch-sensitive display: displaying a camera affordance on the touch-sensitive display; detecting a gesture at a location corresponding to the camera affordance; determining whether the electronic device is wirelessly connected to an external device responsive to remote camera control; in accordance with a determination that the electronic device is wirelessly connected to the external device and in response to the detection of a gesture at a location corresponding to the camera affordance: displaying a remote camera user-interface on the touch-sensitive display, wherein the remote camera user-interface comprises a shutter affordance; receiving data representing an image feed from a camera of the external device; and displaying the image feed in the remote camera user-interface; detecting a gesture at a location corresponding to the shutter affordance; and in response to the detection of a gesture at a location corresponding to the shutter affordance: transmitting an image capture request to the external device, the image capture request associated with an image capture time; and ending the display of the image feed before the image capture time.

In some embodiments, an electronic device comprises: a touch-sensitive display; one or more processors; a memory; and one or more programs, wherein the one or more programs are stored in the memory and configured to be executed by the one or more processors, the one or more programs including instructions for: displaying a camera affordance on the touch-sensitive display; detecting a gesture at a location corresponding to the camera affordance; determining whether the electronic device is wirelessly connected to an external device responsive to remote camera control; in accordance with a determination that the electronic device is wirelessly connected to the external device and in response to the detection of a gesture at a location corresponding to the camera affordance: displaying a remote camera user-interface on the touch-sensitive display, wherein the remote camera user-interface comprises a shutter affordance; receiving data representing an image feed from a camera of the external device; and displaying the image feed in the remote camera user-interface; detecting a gesture at a location corresponding to the shutter affordance; and in response to the detection of a gesture at a location corresponding to the shutter affordance: transmitting an image capture request to the external device, the image capture request associated with an image capture time; and ending the display of the image feed before the image capture time.

In some embodiments, a non-transitory computer readable storage medium stores one or more programs, the one or more programs comprising instructions, which when executed by one or more processors of an electronic device with a touch-sensitive display, cause the device to: display a camera affordance on the touch-sensitive display; detect a gesture at a location corresponding to the camera affordance; determine whether the electronic device is wirelessly connected to an external device responsive to remote camera control; in accordance with a determination that the electronic device is wirelessly connected to the external device and in response to the detection of a gesture at a location corresponding to the camera affordance: display a remote camera user-interface on the touch-sensitive display, wherein the remote camera user-interface comprises a shutter affordance; receive data representing an image feed from a camera of the external device; and display the image feed in the remote camera user-interface; detect a gesture at a location corresponding to the shutter affordance; and in response to the detection of a gesture at a location corresponding to the shutter affordance: transmit an image capture request to the external device, the image capture request associated with an image capture time; and end the display of the image feed before the image capture time.

In some embodiments, an electronic device comprises: a touch-sensitive display; means for displaying a camera affordance on the touch-sensitive display; means for detecting a gesture at a location corresponding to the camera affordance; means for determining whether the electronic device is wirelessly connected to an external device responsive to remote camera control; means for, in accordance with a determination that the electronic device is wirelessly connected to the external device and in response to the detection of a gesture at a location corresponding to the camera affordance: displaying a remote camera user-interface on the touch-sensitive display, wherein the remote camera user-interface comprises a shutter affordance; receiving data representing an image feed from a camera of the external device; and displaying the image feed in the remote camera user-interface; means for detecting a gesture at a location corresponding to the shutter affordance; and means responsive to the detection of a gesture at a location corresponding to the shutter affordance for: transmitting an image capture request to the external device, the image capture request associated with an image capture time; and ending the display of the image feed before the image capture time.

In some embodiments, an electronic device comprises: a touch-sensitive display unit; and a processing unit coupled to the touch-sensitive display unit, the processing unit configured to: enable display of a camera affordance on the touch-sensitive display unit; detect a gesture at a location corresponding to the camera affordance; determine whether the electronic device is wirelessly connected to an external device responsive to remote camera control; in accordance with a determination that the electronic device is wirelessly connected to the external device and in response to the detection of a gesture at a location corresponding to the camera affordance: enable display of a remote camera user-interface on the touch-sensitive display unit, wherein the remote camera user-interface comprises a shutter affordance; receive data representing an image feed from a camera of the external device; and enable display of the image feed in the remote camera user-interface; detect a gesture at a location corresponding to the shutter affordance; and in response to the detection of a gesture at a location corresponding to the shutter affordance: transmit an image capture request to the external device, the image capture request associated with an image capture time; and end the display of the image feed before the image capture time.

In some embodiments, a method comprises: at an electronic device with a touch-sensitive display and a rotatable input mechanism: displaying a camera affordance on the touch-sensitive display; detecting a gesture at a location corresponding to the camera affordance; determining whether the electronic device is wirelessly connected to an external device responsive to remote camera control; in accordance with a determination that the electronic device is wirelessly connected to the external device and in response to the detection of a gesture at a location corresponding to the camera affordance: displaying a remote camera user-interface on the touch-sensitive display; receiving data representing an image feed from a camera of the external device; and displaying the image feed in the remote camera user-interface; detecting movement of the rotatable input mechanism; and in response to the detection of movement of the rotatable input mechanism: resizing a display of the image feed in the remote camera user-interface.

In some embodiments, an electronic device comprises: a touch-sensitive display; a rotatable input mechanism; one or more processors; a memory; and one or more programs, wherein the one or more programs are stored in the memory and configured to be executed by the one or more processors, the one or more programs including instructions for: displaying a camera affordance on the touch-sensitive display; detecting a gesture at a location corresponding to the camera affordance; determining whether the electronic device is wirelessly connected to an external device responsive to remote camera control; in accordance with a determination that the electronic device is wirelessly connected to the external device and in response to the detection of a gesture at a location corresponding to the camera affordance: displaying a remote camera user-interface on the touch-sensitive display; receiving data representing an image feed from a camera of the external device; and displaying the image feed in the remote camera user-interface; detecting movement of the rotatable input mechanism; and in response to the detection of movement of the rotatable input mechanism: resizing a display of the image feed in the remote camera user-interface.

In some embodiments, a non-transitory computer readable storage medium stores one or more programs, the one or more programs comprising instructions, which when executed by one or more processors of an electronic device with a touch-sensitive display and a rotatable input mechanism, cause the device to: display a camera affordance on the touch-sensitive display; detect a gesture at a location corresponding to the camera affordance; determine whether the electronic device is wirelessly connected to an external device responsive to remote camera control; in accordance with a determination that the electronic device is wirelessly connected to the external device and in response to the detection of a gesture at a location corresponding to the camera affordance: display a remote camera user-interface on the touch-sensitive display; receive data representing an image feed from a camera of the external device; and display the image feed in the remote camera user-interface; detect movement of the rotatable input mechanism; and in response to the detection of movement of the rotatable input mechanism: resize a display of the image feed in the remote camera user-interface.

In some embodiments, an electronic device comprises: a touch-sensitive display; a rotatable input mechanism; and means for displaying a camera affordance on the touch-sensitive display; means for detecting a gesture at a location corresponding to the camera affordance; means for determining whether the electronic device is wirelessly connected to an external device responsive to remote camera control; means for, in accordance with a determination that the electronic device is wirelessly connected to the external device and in response to the detection of a gesture at a location corresponding to the camera affordance: displaying a remote camera user-interface on the touch-sensitive display; receiving data representing an image feed from a camera of the external device; and displaying the image feed in the remote camera user-interface; means for detecting movement of the rotatable input mechanism; and means responsive to the detection of movement of the rotatable input mechanism for: resizing a display of the image feed in the remote camera user-interface.

In some embodiments, an electronic device comprises: a touch-sensitive display unit; a rotatable input mechanism unit; and a processing unit coupled to the touch-sensitive display unit and the rotatable input mechanism unit, the processing unit configured to: enable display of a camera affordance on the touch-sensitive display unit; detect a gesture at a location corresponding to the camera affordance; determine whether the electronic device is wirelessly connected to an external device responsive to remote camera control; in accordance with a determination that the electronic device is wirelessly connected to the external device and in response to the detection of a gesture at a location corresponding to the camera affordance: enable display of a remote camera user-interface on the touch-sensitive display unit; receive data representing an image feed from a camera of the external device; and enable display of the image feed in the remote camera user-interface; detect movement of the rotatable input mechanism unit; and in response to the detection of movement of the rotatable input mechanism unit: resize a display of the image feed in the remote camera user-interface.

In some embodiments, a method comprises: at an electronic device with a touch-sensitive display and a rotatable input mechanism: displaying a camera affordance on the touch-sensitive display; detecting a gesture at a location corresponding to the camera affordance; determining whether the electronic device is wirelessly connected to an external device responsive to remote camera control; in accordance with a determination that the electronic device is wirelessly connected to the external device and in response to the detection of a gesture at a location corresponding to the camera affordance: displaying a remote camera user-interface on the touch-sensitive display; receiving data representing an image feed from a camera of the external device; and displaying the image feed in the remote camera user-interface; detecting movement of the rotatable input mechanism; and in response to the detection of movement of the rotatable input mechanism: transmitting a focus setting selection to the external device.

In some embodiments, an electronic device comprises: a touch-sensitive display; a rotatable input mechanism; one or more processors; a memory; and one or more programs, wherein the one or more programs are stored in the memory and configured to be executed by the one or more processors, the one or more programs including instructions for: displaying a camera affordance on the touch-sensitive display; detecting a gesture at a location corresponding to the camera affordance; determining whether the electronic device is wirelessly connected to an external device responsive to remote camera control; in accordance with a determination that the electronic device is wirelessly connected to the external device and in response to the detection of a gesture at a location corresponding to the camera affordance: displaying a remote camera user-interface on the touch-sensitive display; receiving data representing an image feed from a camera of the external device; and displaying the image feed in the remote camera user-interface; detecting movement of the rotatable input mechanism; and in response to the detection of movement of the rotatable input mechanism: transmitting a focus setting selection to the external device.

In some embodiments, a non-transitory computer readable storage medium stores one or more programs, the one or more programs comprising instructions, which when executed by one or more processors of an electronic device with a touch-sensitive display and a rotatable input mechanism, cause the device to: display a camera affordance on the touch-sensitive display; detect a gesture at a location corresponding to the camera affordance; determine whether the electronic device is wirelessly connected to an external device responsive to remote camera control; in accordance with a determination that the electronic device is wirelessly connected to the external device and in response to the detection of a gesture at a location corresponding to the camera affordance: display a remote camera user-interface on the touch-sensitive display; receive data representing an image feed from a camera of the external device; and display the image feed in the remote camera user-interface; detect movement of the rotatable input mechanism; and in response to the detection of movement of the rotatable input mechanism: transmit a focus setting selection to the external device.

In some embodiments, an electronic device comprises: a touch-sensitive display; a rotatable input mechanism; and means for displaying a camera affordance on the touch-sensitive display; means for detecting a gesture at a location corresponding to the camera affordance; means for determining whether the electronic device is wirelessly connected to an external device responsive to remote camera control; means for, in accordance with a determination that the electronic device is wirelessly connected to the external device and in response to the detection of a gesture at a location corresponding to the camera affordance: displaying a remote camera user-interface on the touch-sensitive display; receiving data representing an image feed from a camera of the external device; and displaying the image feed in the remote camera user-interface; means for detecting movement of the rotatable input mechanism; and means responsive to the detection of movement of the rotatable input mechanism for: transmitting a focus setting selection to the external device.

In some embodiments, an electronic device comprises: a touch-sensitive display unit; a rotatable input mechanism unit; and a processing unit coupled to the touch-sensitive display unit and the rotatable input mechanism unit, the processing unit configured to: enable display of a camera affordance on the touch-sensitive display unit; detect a gesture at a location corresponding to the camera affordance; determine whether the electronic device is wirelessly connected to an external device responsive to remote camera control; in accordance with a determination that the electronic device is wirelessly connected to the external device and in response to the detection of a gesture at a location corresponding to the camera affordance: enable display of a remote camera user-interface on the touch-sensitive display unit; receive data representing an image feed from a camera of the external device; and enable display of the image feed in the remote camera user-interface; detect movement of the rotatable input mechanism unit; and in response to the detection of movement of the rotatable input mechanism unit: transmit a focus setting selection to the external device.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

As discussed above, a user may wish to have remote camera control, without carrying a relatively large additional item. Camera control may include control of an external device's camera features, including image capture, zoom settings, focus settings, flash settings, and timer settings, for example, and may also include access to the external device's library of previously captured images. It is desirable to provide remote camera control in a reduced-sized electronic device to reduce the user's burden.

Figure 15:
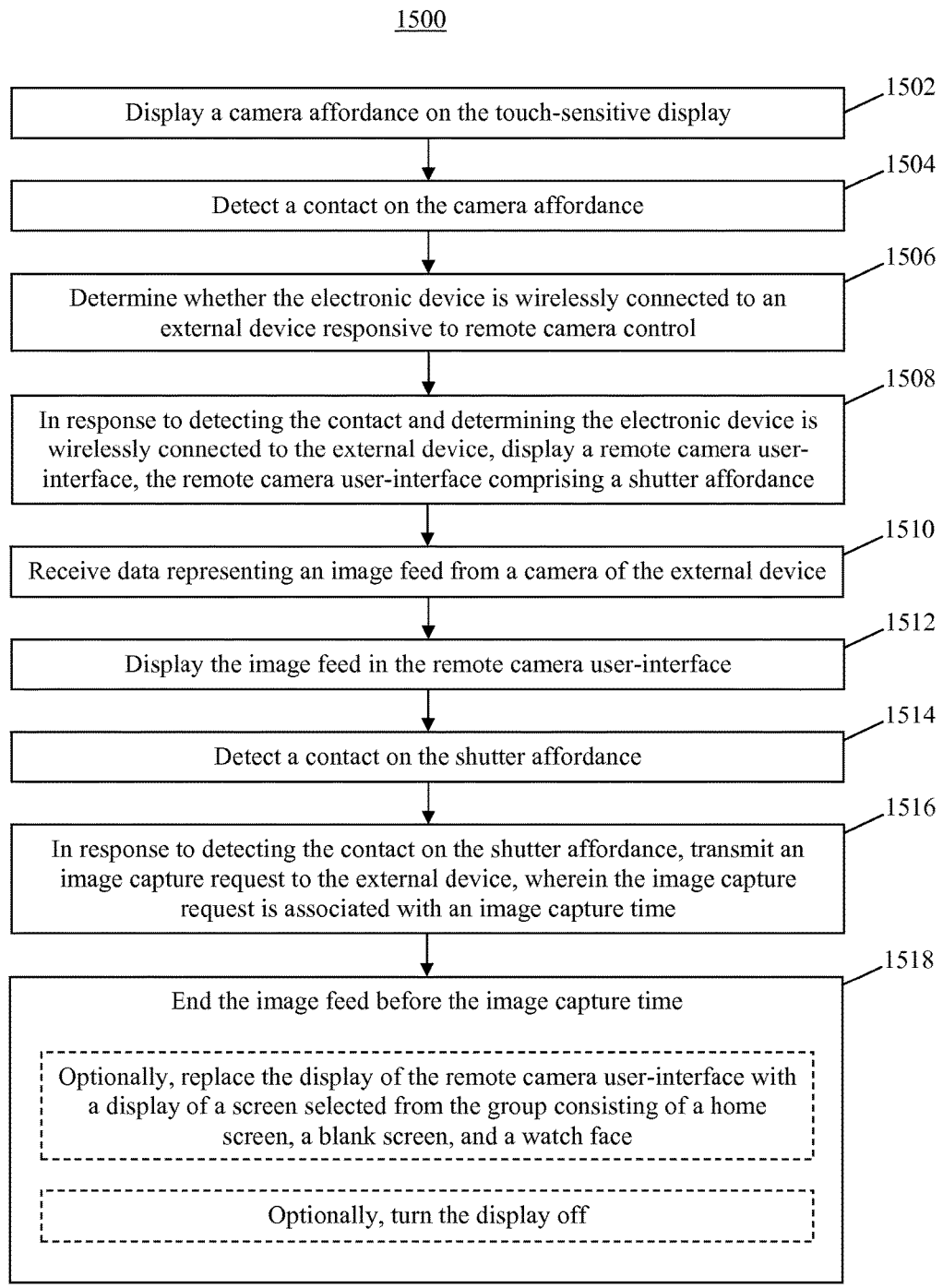
FIG. 15 is a flow diagram illustrating a process for providing remote camera control user interfaces.
Figure 16:
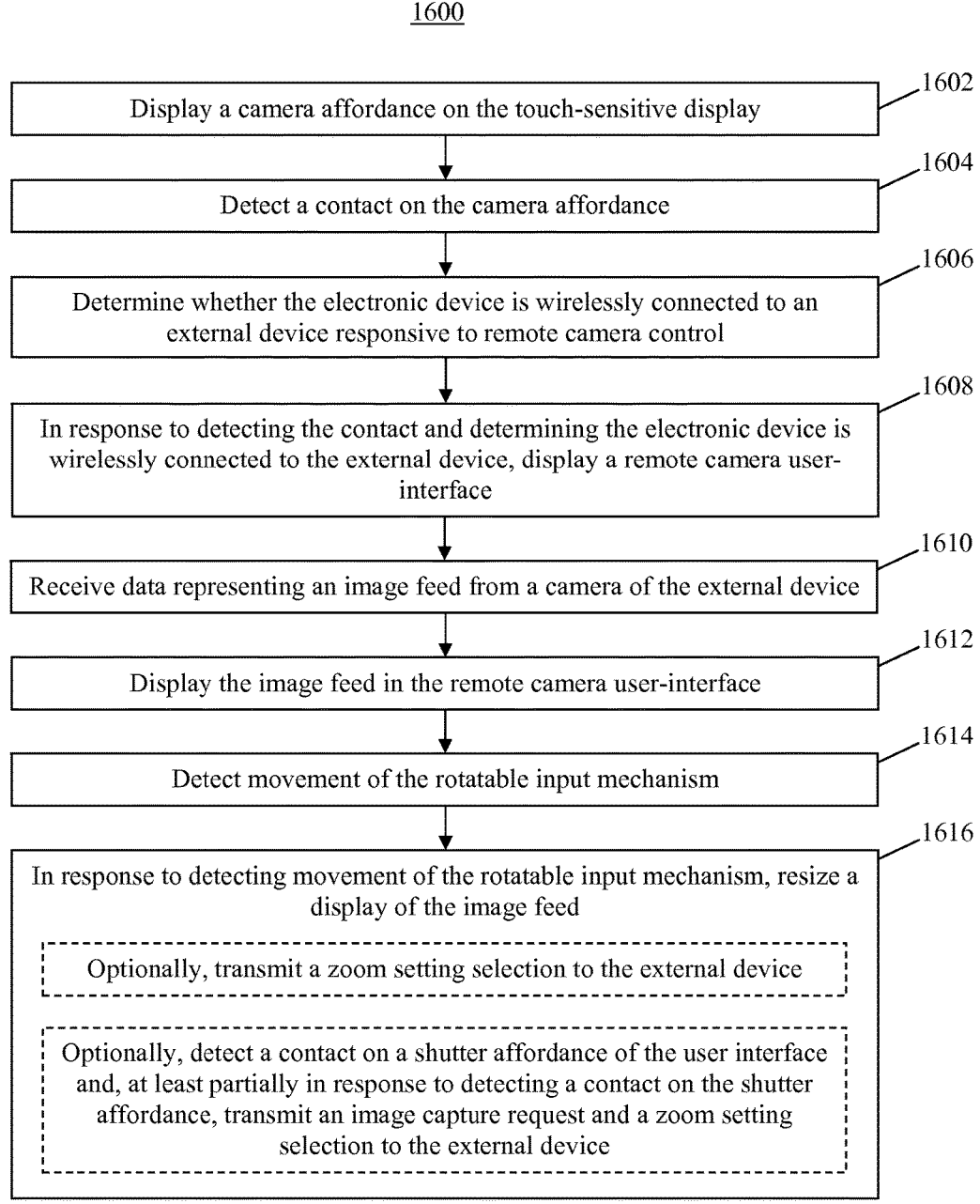
FIG. 16 is a flow diagram illustrating a process for providing remote camera control user interfaces.
Figure 17:
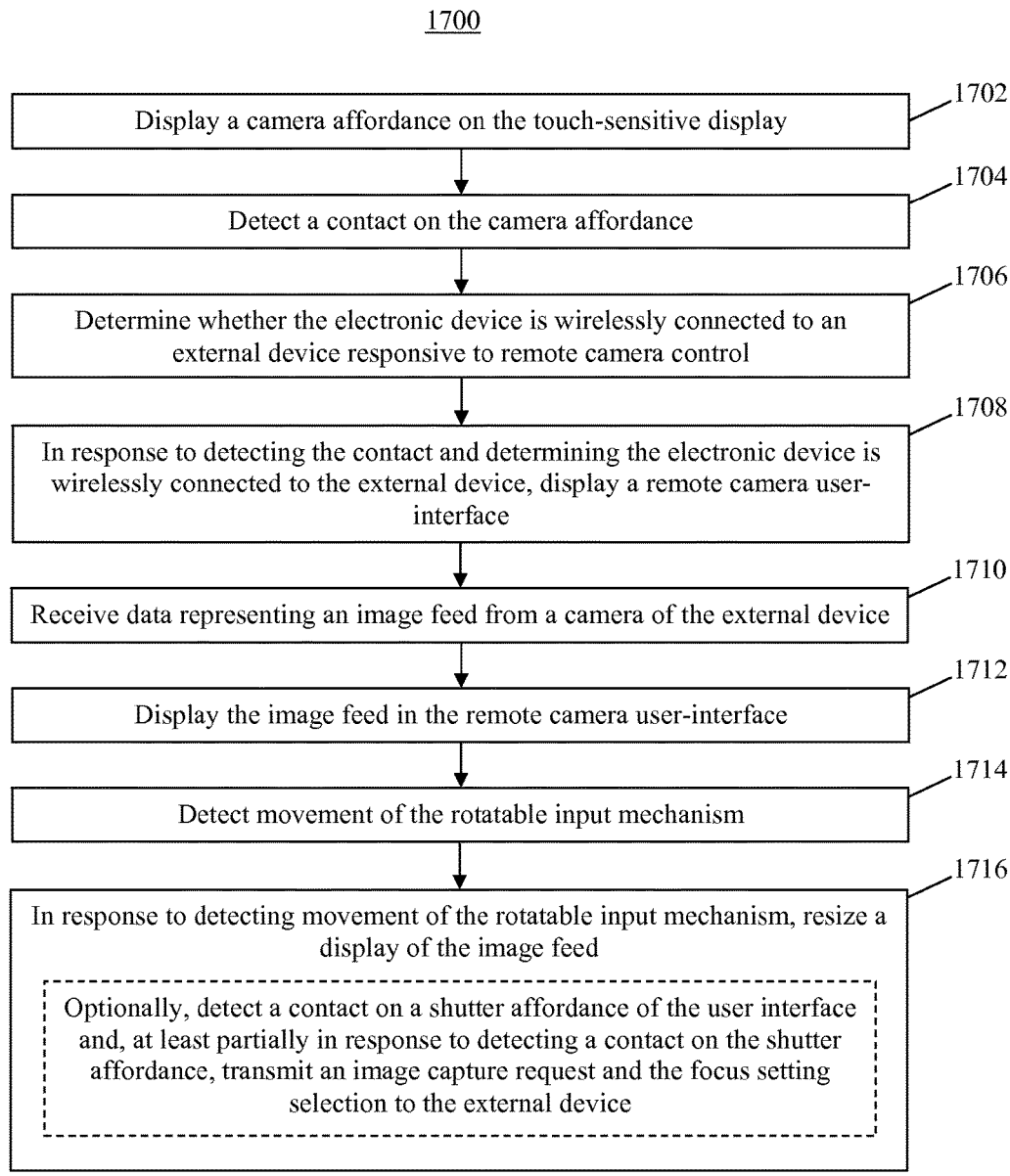
FIG. 17 is a flow diagram illustrating a process for providing remote camera control user interfaces.

Below, FIGS. 1A-1B, 2, 3, 4A-4B, 5A-5B, and 18-21 provide a description of exemplary devices for performing the techniques for providing remote camera control user interfaces. FIGS. 6-14 illustrate exemplary user interfaces for providing remote camera control on these exemplary devices. FIGS. 15-17 are flow diagrams illustrating methods of providing remote camera control user interfaces. The user interfaces in FIGS. 6-14 are also used to illustrate the processes described below, including the processes in FIGS. 15-17.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
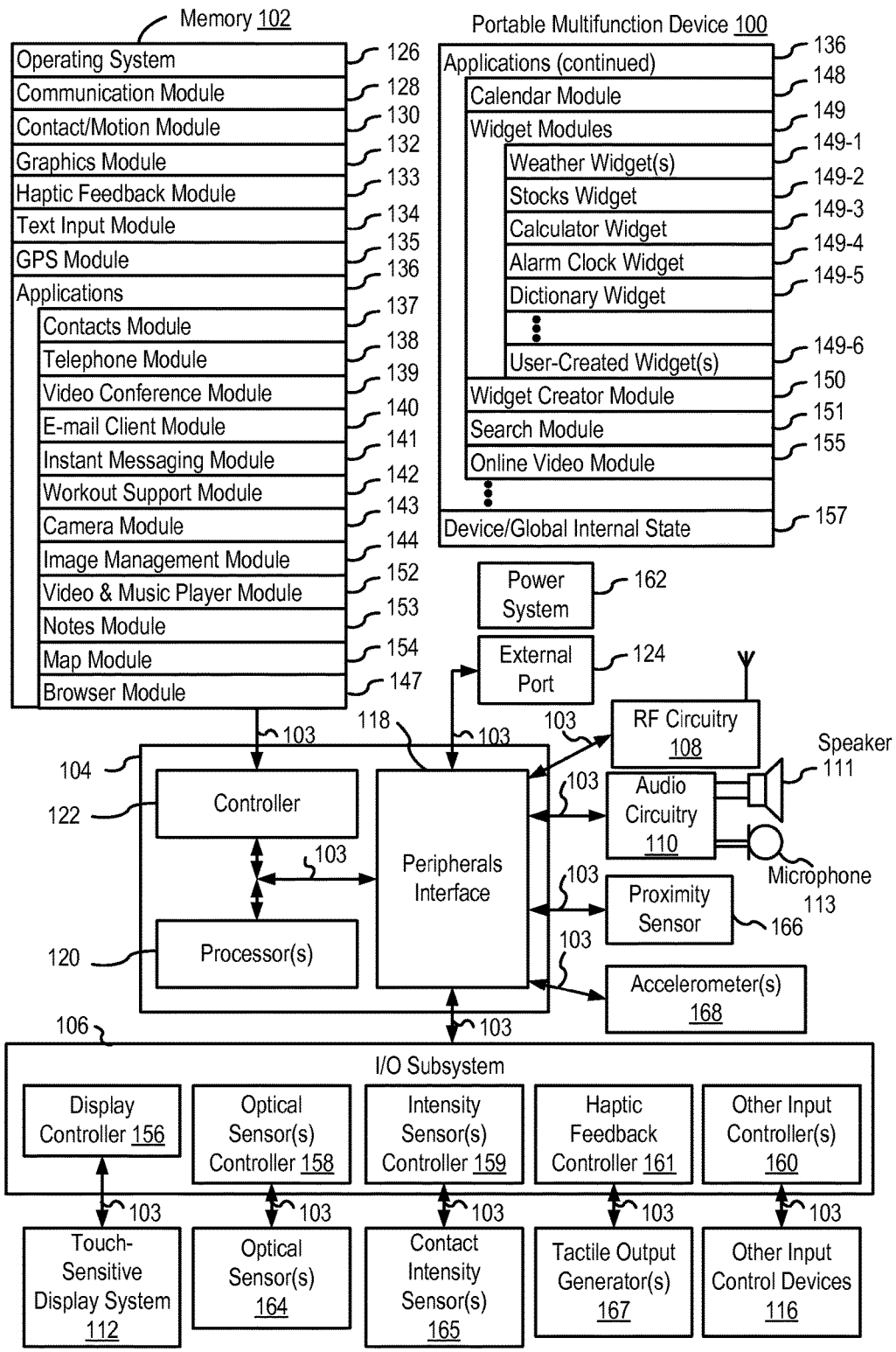
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser.

No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
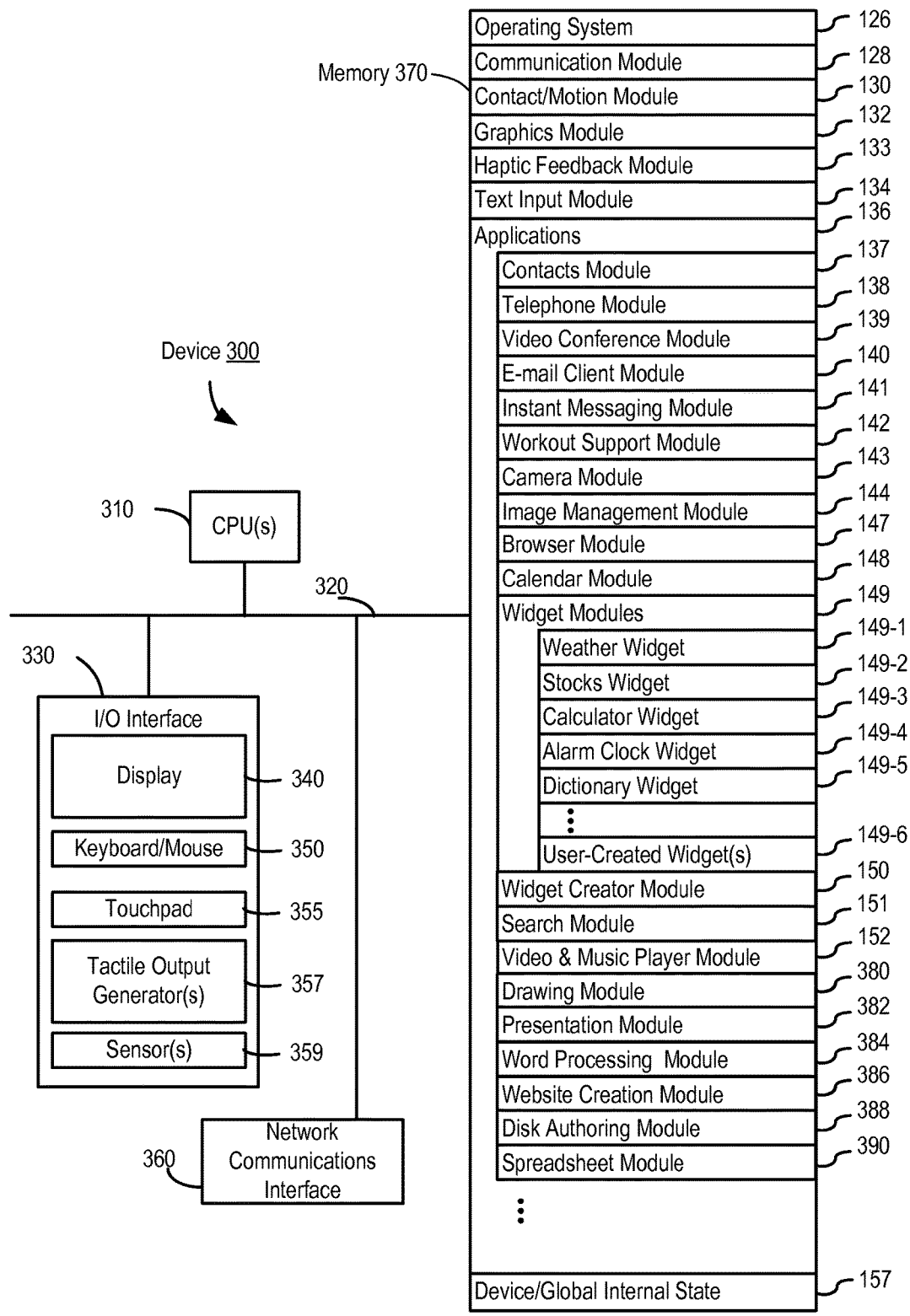
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
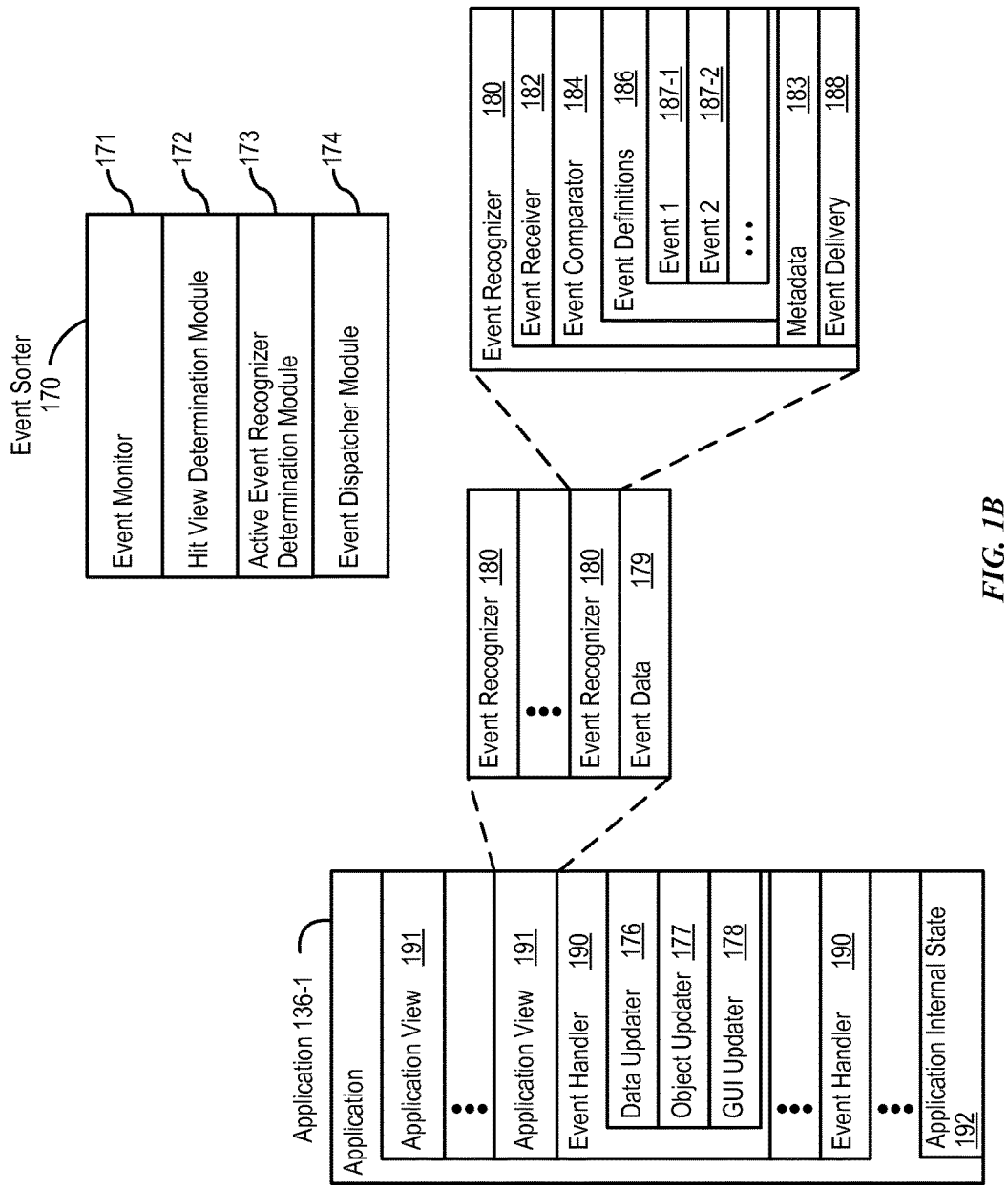
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
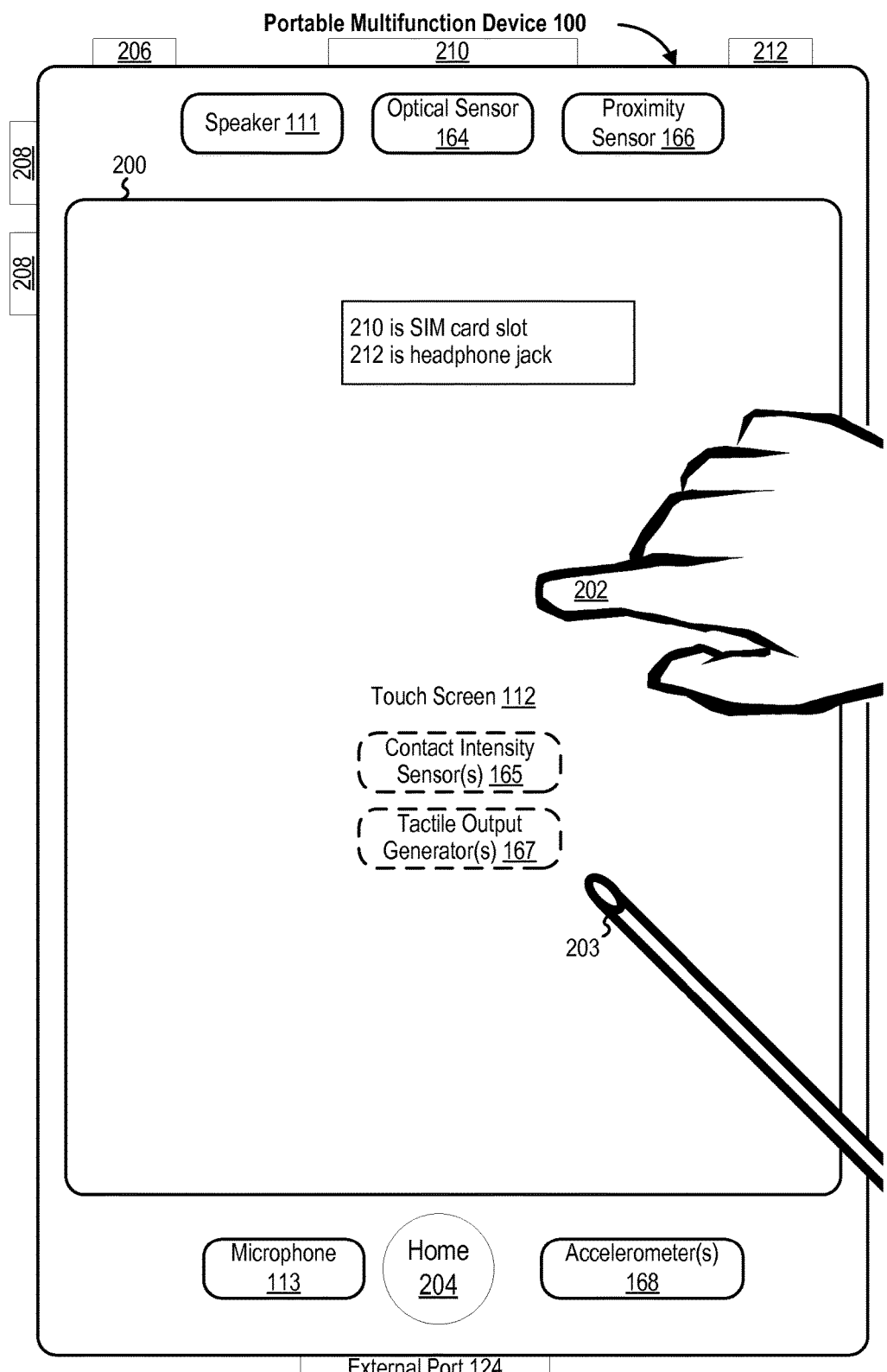
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
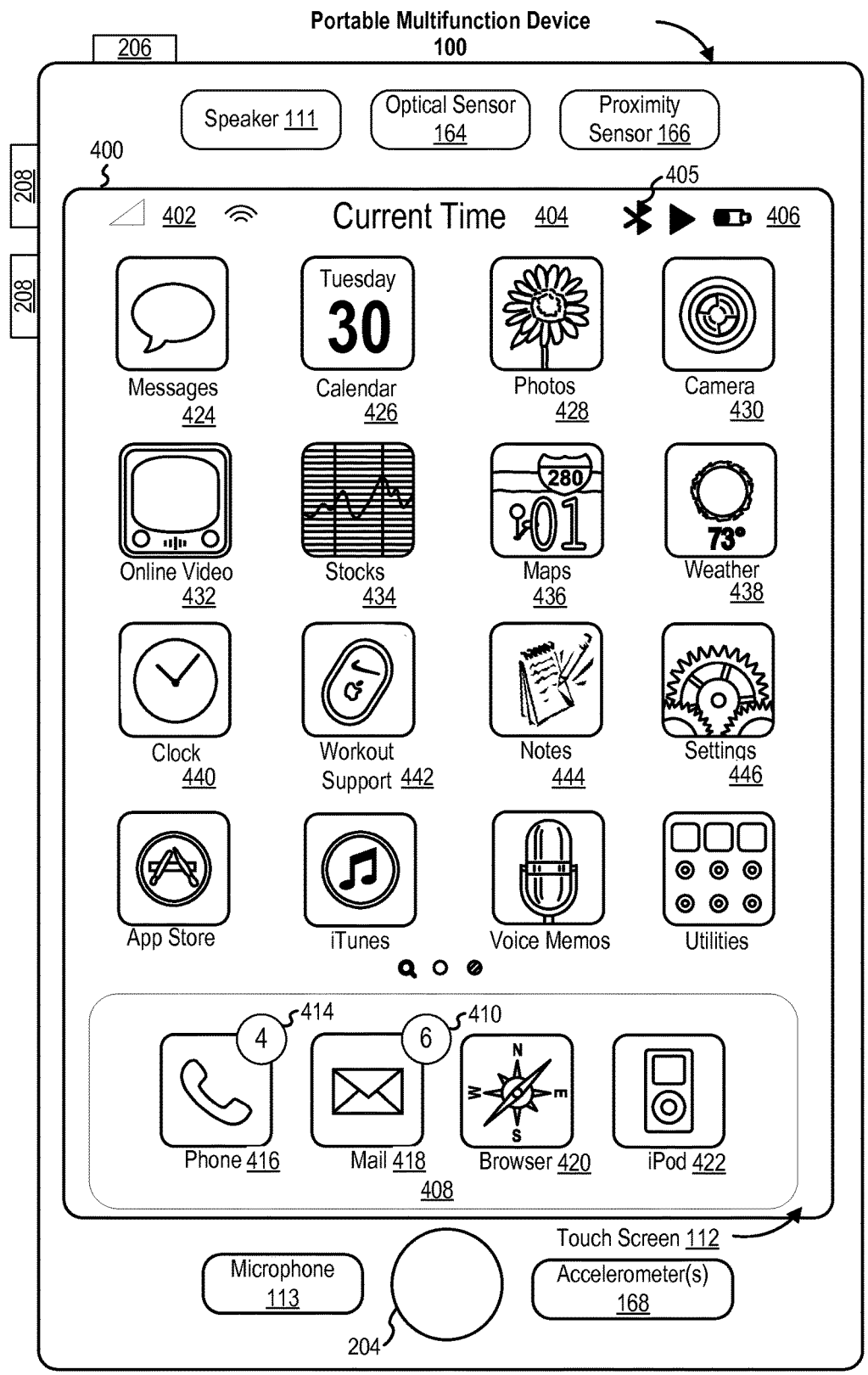
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
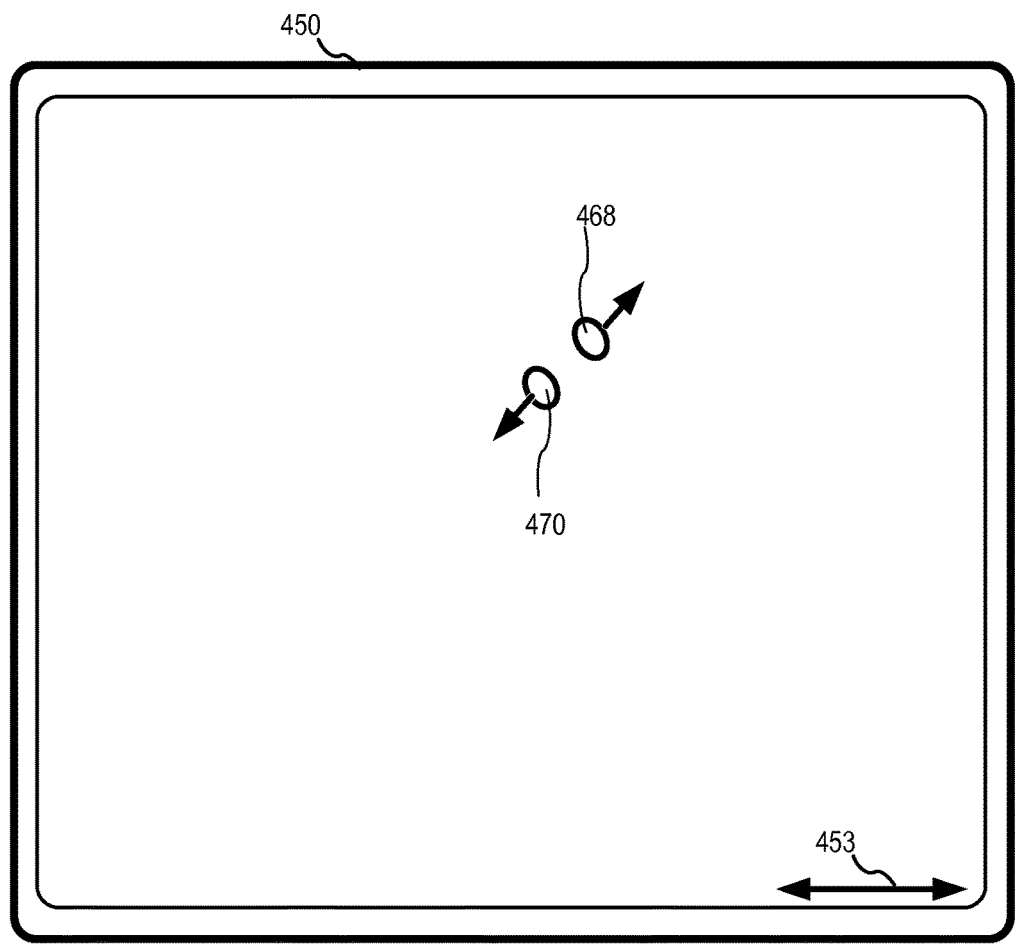
FIG. 4B illustrates an exemplary user interface for a multifunction device with a touch-sensitive surface that is separate from the display in accordance with some embodiments.
Figure 4B:
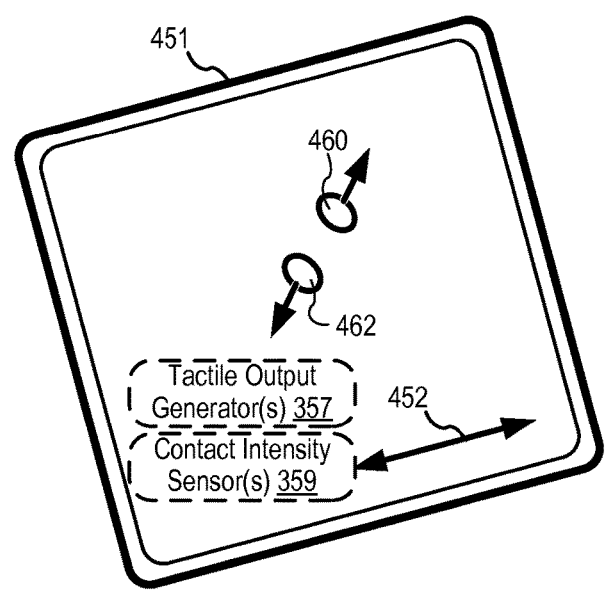

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
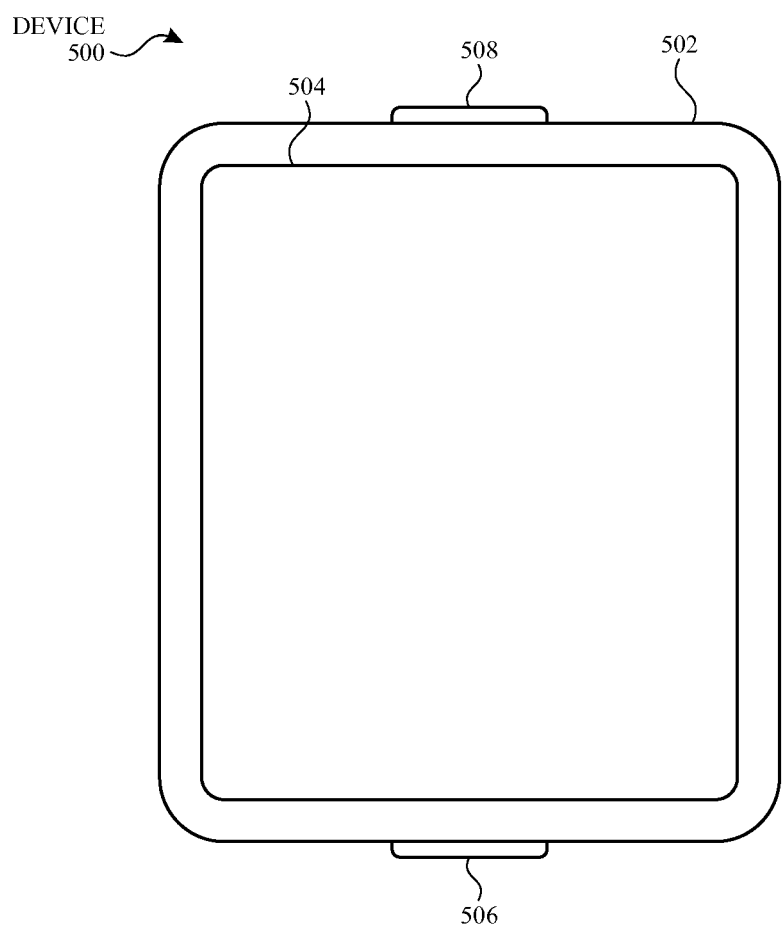
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
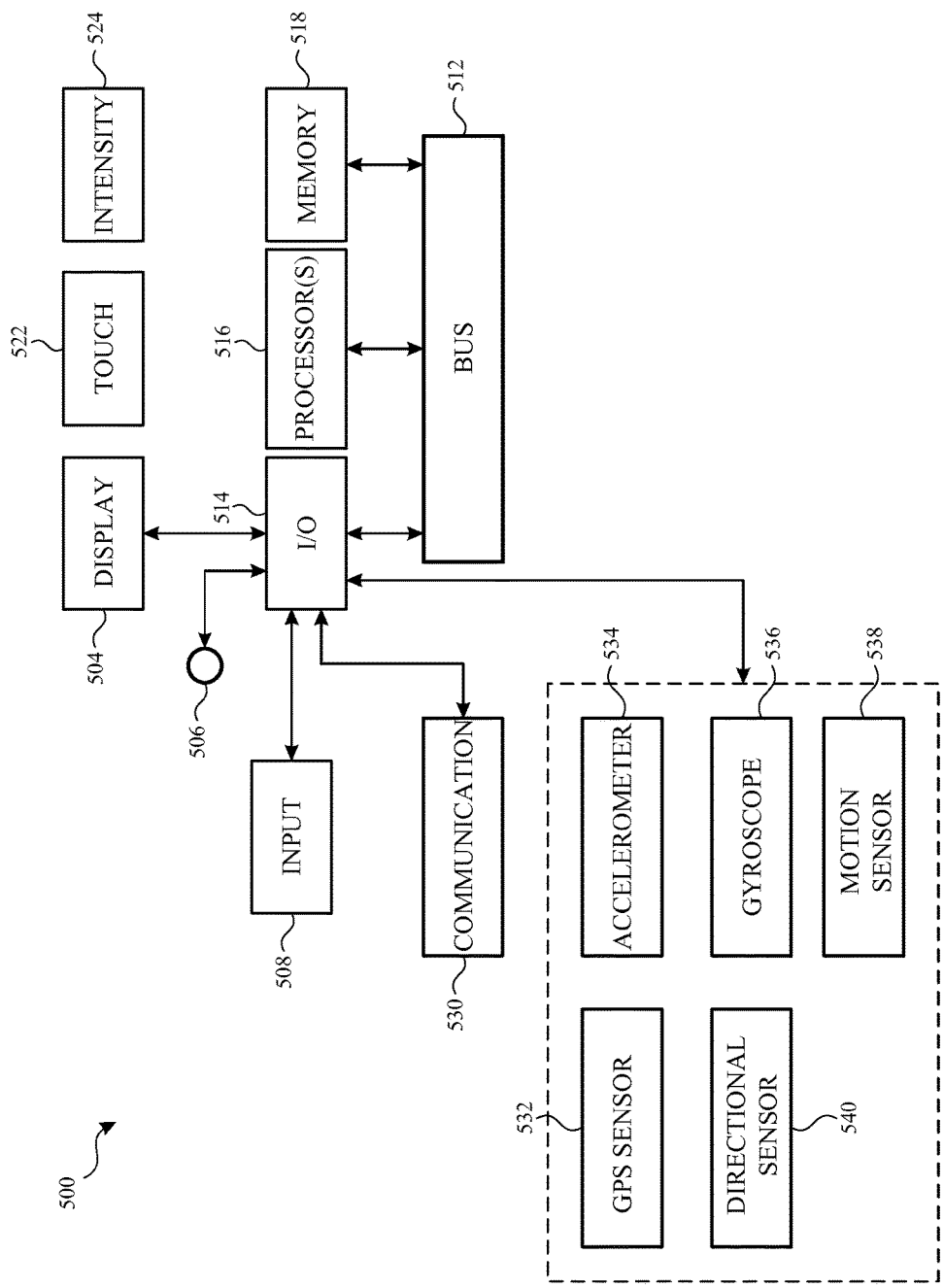
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1500-1700 (FIGS. 15-17). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on a multifunction device with a display and a touch-sensitive surface, such as devices 100, 300, 500, 1800, 1900, 2000, and/or 2100 (FIGS. 1A, 3A, 5A, and/or 18-21), to provide remote camera control to a user on a reduced-size device.

The user interfaces for providing remote camera control (also referred to as "remote camera user interfaces") described below are illustrated by exemplary sequences of screens that one or more of devices 100, 300, and/or 500 can display in response to detecting various user inputs. In these sequences, the arrows indicate the order in which the screens are displayed, and the text shown above the arrows indicates exemplary inputs detected by the device. The device may respond similarly to different inputs; not all possible inputs that can result in the depicted sequence of screens are shown.

Figure 6:
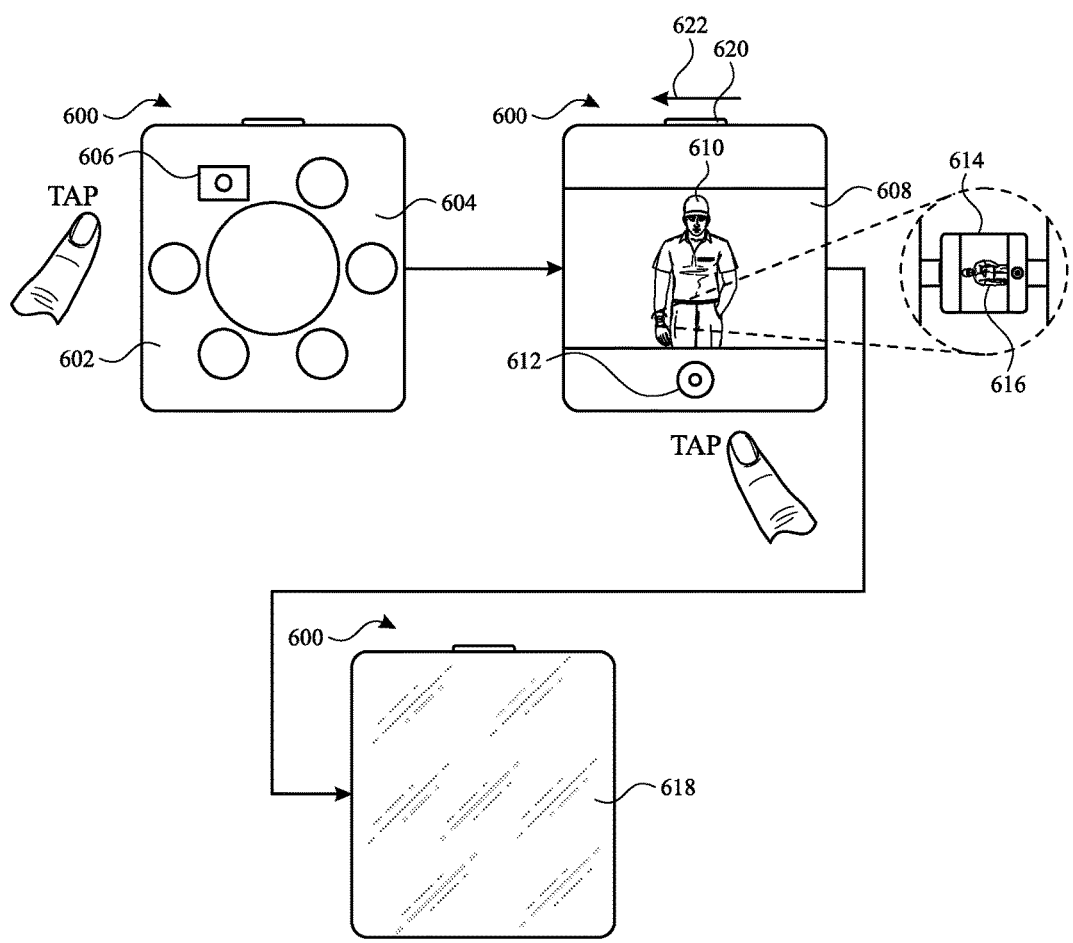
FIG. 6 illustrates exemplary user interfaces for providing remote camera control.

FIG. 6 shows exemplary user interface screen 602 that device 600 can display on touchscreen 604. Device 600 is a multifunction device 500 in some embodiments. Screen 602 can be, for example, a home screen that appears when the display of device 600 is powered on, or that appears in response to user input on device 600. Screen 602 displays affordances that may be used to launch software applications installed on device 600.

Affordance 606 corresponds to a remote camera control application in that the remote camera control application may launch in response to a user's selection of affordance 606. A remote camera control application may enable a user of device 600 to wirelessly control camera functions of an external device (e.g., a camera of device 100 in FIG. 4A).

Camera control optionally includes control of the external device's camera features, including image capture, zoom settings, focus settings, flash settings, and timer settings, for example. Camera control may also include access to the external device's library of previously captured images. In some embodiments, the camera is installed in a housing of the external device. In other embodiments, the camera is not installed in a housing of the external device, but is controlled by the external device.

A user may select (e.g., make touch contact) with affordance 606 to launch the remote camera control application. In response to detecting a user's selection of affordance 606 and determining that device 600 is wirelessly connected to an external device responsive to remote camera control, device 600 launches the remote camera control application and displays a user interface screen 608 conveying affordances for providing control of a camera of the external device. If device 600 determines that device 600 is not connected to an external device responsive to remote camera control, device 600 may take other actions, including providing a visual notification that remote camera control is not available (as described further below), reviewing captured images that are stored on the electronic device, or storing flash, zoom, or timer settings for a future wireless connection with the external device. Determining whether device 600 is wirelessly connected to an external device responsive to remote camera control optionally occurs before, at the same time, or after detecting a user's selection of affordance 606.

In some embodiments, the external device is preselected by a user of device 600. In other embodiments, device 600 displays affordances (not shown) for a list of available external devices responsive to camera control by device 600, in response to selection of affordance 606.

Device 600 receives data from the external device representing an image feed from the camera of the external device, in response to detecting selection of affordance 606 and a determination that device 600 is connected to an external device that is responsive to remote camera control. In some embodiments, an image feed represents a scene in real time or with some processing delay. Device 600 displays the image feed 610 on the user interface 608.

In some embodiments, image feed 610 includes a representation of the user of device 600. Advantageously, this arrangement may allow the user of device 600 to retain control of the camera operations and also to be included in the captured image. The effect of this feature may be to advantageously alleviate some known problems with prior art remote devices—a user was typically unable to evaluate a scene with the user in it, especially a scene that cannot be captured by holding and reversing a camera (e.g. a "selfie").

Image feed 610 includes a representation 614 of device 600. This may occur, for example, when device 600 is wearable by the user (such as attached to the wrist of the user). In this example, when the user is included in the image feed, then a representation 614 of device 600 may also be included in the image feed. The representation 614 of device 600 also includes a representation 616 of the image feed that is currently displayed in the remote camera control user interface.

In some embodiments, remote camera user-interface 608 includes a shutter affordance 612. In response to detection of a gesture at a location corresponding to the shutter affordance, device 600 transmits an image capture request to the external device. The image capture request is associated with an image capture time.

The image capture request is optionally a request for an instantaneous capture, e.g., the image is captured when the external device receives the request. In such an embodiment, the image capture time is the same instant the image capture request is transmitted. In some embodiments, the image capture time is estimated based on a timer setting, or is based on an estimated processing lag. In some embodiments, the image capture request includes the image capture time, e.g., by including a requested image capture time.

In some embodiments, device 600 ends the display 618 of the image feed 610 before the image capture time. In this way, embodiments described herein may advantageously allow for capture of the scene without depicting the image feed. The effect of this feature may be to improve the resulting captured image—a later viewer of the captured image is not reminded of the process of taking the picture using device 600, thereby providing a more causal and natural captured image.

In some embodiments, device 600 ends the display of the image feed by replacing the display of the remote camera user-interface with a display of a screen selected from the group consisting of a home screen, a blank screen, and a watch face. In some other embodiments, device 600 ends the display of the image feed by turning off the display.

User interface 608 may be too large to be displayed completely on-screen at one time. When a first portion of user interface 608 is displayed, a user may rotate rotatable input mechanism 620 in a particular direction (e.g., rotation 622) to scroll the displayed portion of user interface 608 to display the second portion.

In some embodiments, scrolling the first user interface includes translating the first user interface screen on-screen. In some embodiments, the extent of rotation is proportional to the amount of scrolling of the display (e.g., on-screen translation). In this scenario, a smaller rotation scrolls the displayed portion of the user interface less than a larger rotation. Relating the extent of rotation of the rotatable input mechanism 620 allows the user to precisely control which content(s) of the user interface are to be viewed.

Figure 7:
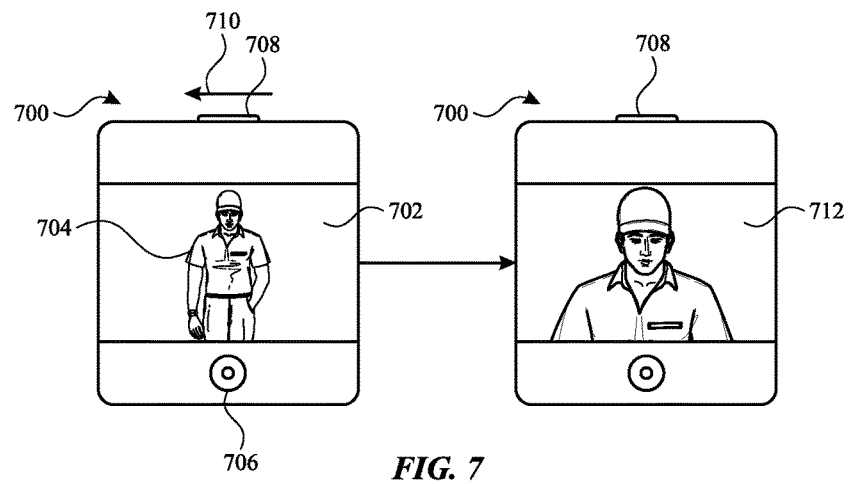
FIG. 7 illustrates exemplary user interfaces for providing remote camera control.

Attention is now directed to a remote camera control user interface that is displayed in some embodiments, with reference to FIG. 7. FIG. 7 shows exemplary user interface screen 702 that device 700 can display on a touchscreen. In some embodiments, device 700 is device 500 (FIG. 5). User interface 702 is optionally a remote camera control user interface, and includes an image feed 704 received from a camera of an external device (not shown). User interface 702 includes a shutter affordance 706. In some embodiments, remote camera control user interface 702 is displayed in response to detecting a user's selection of a camera affordance from a user interface of device 700.

Device 700 includes a rotatable input mechanism 708. Rotatable input mechanism 708 is optionally configured to enable a user to alter zoom of the image feed. To alter zoom, a user may rotate rotatable input mechanism 708 in direction 710. In response to detecting movement of the rotatable input mechanism 708, device 700 resizes the display of the image feed 712 in the remote camera user-interface.

In the exemplary embodiment of FIG. 7, a counterclockwise rotation of rotatable input mechanism 708 resulted in a "zoom-in" of the image, that is, the size of image feed is increased in the display. In some embodiments, a clockwise rotation of rotatable input mechanism 708 results in "zoom-out" of the image, that is, the size of the image feed is decreased in the display. In some embodiments, the amount of resizing is linearly related to the degree of rotation. In other embodiments, the amount of resizing is non-linearly related to the degree of rotation.

In some embodiments, a zoom setting selection is transmitted to the external device, in response to detecting movement of the rotatable input mechanism. In some embodiments, the zoom setting selection is transmitted immediately in response to detecting movement of the rotatable input mechanism. In this way, the external device can alter the zoom setting on the associated camera and the image feed from the external device to device 700 can be updated. This may have the advantageous effect of providing the user with a real-time view of the camera's zoomed in image. In other embodiments, the zoom setting selection is transmitted to the external device with an image capture request. In this way, device 700 can send one zoom request to the external device while allowing the user to zoom the image to various levels when preparing to capture an image. This may have the advantageous effect of reducing the wireless communication with the external devices and limiting expenditure of processing resources of the external device.

Figure 8:
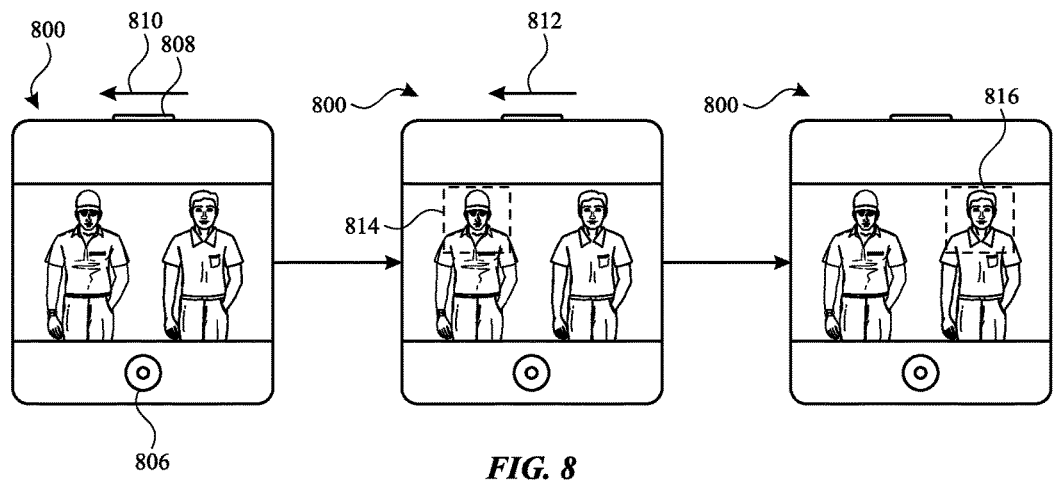
FIG. 8 illustrates exemplary user interfaces for providing remote camera control.

Attention is now directed to a remote camera control user interface that is displayed in some embodiments, with reference to FIG. 8. FIG. 8 shows exemplary user interface screen 802 that device 800 can display on a touchscreen. In some embodiments, device 800 is device 500 (FIG. 5). User interface 802 is a remote camera control user interface, and includes an image feed 804 received from a camera of an external device (e.g., a camera of device 100 in FIG. 4A). User interface 802 includes a shutter affordance 806. In some embodiments, remote camera control user interface 802 is displayed in response to detecting a user's selection of a camera affordance from a user interface of device 800.

Device 800 includes a rotatable input mechanism 808. Rotatable input mechanism 808 is configured to enable a user to change the focus of the camera of the external device. To change focus, a user may rotate rotatable input mechanism 808 in direction 810. In response to detecting movement of the rotatable input mechanism 808, device 800 transmits a focus setting selection to the external device.

As used herein, a "focus setting" refers to a camera setting that controls how the convergence of light is captured by the camera to define a part of the image that is "in focus" and other parts as being "out of focus" based on distance from the camera.

Device 800 also provides a visual indication of the focus setting 814. In the example provided in FIG. 8, a broken square depicts the selection of the focus setting, but other visual indications could be used without deviating from the scope of the claimed subject matter.

In some embodiments, the focus setting is coupled with a face detection system. The face detection system may change the focus successively between faces detected in the image feed. In response to detecting a movement of rotatable input mechanism 808 in direction 812, device 800 changes the focus setting to another face detected in the image feed. Device 800 optionally provides a visual indication of the new focus setting 816.

In some embodiments, the focus setting selection incrementally moves within the user interface. For example, a visual indication (such as the broken square discussed above) moves a distance across the image feed (for example, moving between points on a grid). Once the visual indication has stopped moving, a focus setting corresponding to the location of the visual indication is transmitted to the external device.

Figure 9:
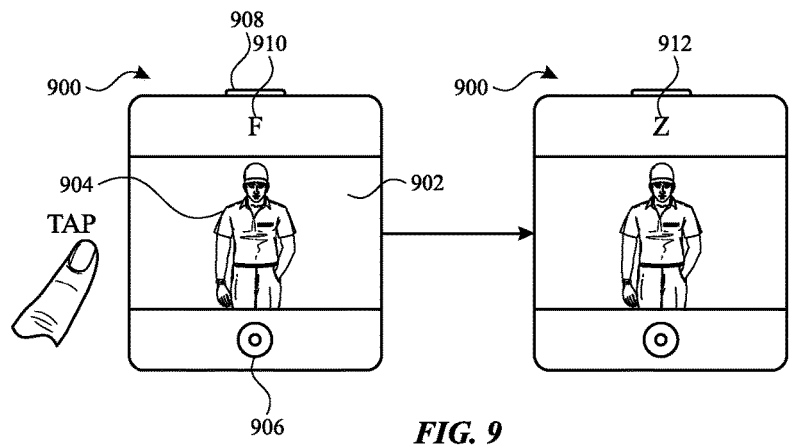
FIG. 9 illustrates exemplary user interfaces for providing remote camera control.

Attention is now directed to a remote camera control user interface that is displayed in some embodiments, with reference to FIG. 9. FIG. 9 shows exemplary user interface screen 902 that device 900 can display on a touchscreen. In some embodiments, device 900 is device 500 (FIG. 5). User interface 902 is a remote camera control user interface, and includes an image feed 904 received from a camera of an external device (not shown). User interface screen 902 includes a shutter affordance 906. In some embodiments, remote camera control user interface 902 is displayed in response to detecting a user's selection of a camera affordance from a user interface of device 900.

Device 900 includes a rotatable input mechanism 908. In some embodiments, user interface 902 includes toggle affordance 910 that notifies the user of an action associated with movement of rotatable input mechanism 908. For example, toggle affordance 910 includes an "F," indicating that movement of the rotatable input mechanism 908 will provide focus functionality, such as that described above with respect to FIG. 8 and device 800. In some embodiments (not shown), the toggle affordance is presented a toggle switch that is actuated between a first position associated with a first function and a second position associated with a second function.

In response to detecting a contact on toggle affordance 910, an action associated with detecting movement of the rotatable input mechanism 908 is changed. In the example of FIG. 9, the action is changed from one of transmitting a focus setting selection to the external device to resizing the display of the image feed in the remote camera user-interface. To reflect this change in an action associated with detecting movement of the rotatable input mechanism 908, toggle affordance 912 includes a "Z" to reflect the zoom setting selection now associated with rotatable input mechanism 908. Movement of the rotatable input mechanism 908 will now provide zoom functionality, such as that described above with respect to FIG. 7 and device 700.

Descriptions of rotatable input mechanisms (such as rotatable input mechanisms 506, 620, 708, 808, and 908) described herein have primarily related to control camera features (such as preview, zoom, focus, and capturing images). It should be noted that the rotatable input mechanisms of electronic devices 500, 600, 700, 800, and 900 can provide a variety of other functions included on the electronic device(s). In other embodiments, rotatable input mechanisms 506, 620, 708, 808, and 908 provide, for example, resizing or scrolling a home page or springboard, scrolling between geographic locations (e.g., cities) in a weather application, scrolling through playlists in a music player application, adjusting volume in an audio application, scrolling through names in a contacts application, and changing the view angle/perspective in a clock face application.

Figure 10:
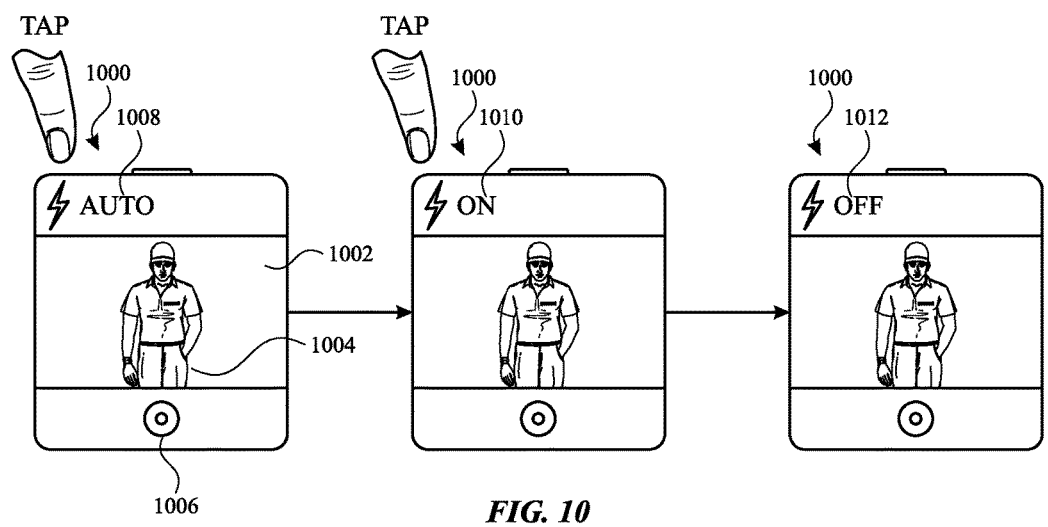
FIG. 10 illustrates exemplary user interfaces for providing remote camera control.

Attention is now directed to a remote camera control user interface that is displayed in some embodiments, with reference to FIG. 10. FIG. 10 shows exemplary user interface screen 1002 that device 1000 can display on touchscreen 1004. In some embodiments, device 1000 is device 500 (FIG. 5). User interface 1002 is a remote camera control user interface, and includes an image feed 1004 received from a camera of an external device (e.g., a camera of device 100 in FIG. 4A). User interface 1002 includes a shutter affordance 1006. In some embodiments, remote camera control user interface 1002 is displayed in response to detecting a user's selection of a camera affordance from a user interface of device 1000.

In some embodiments, user interface 1002 includes flash affordance 1008. In response to detecting contact on flash affordance 1008, device 1000 transmits a camera flash selection to the external device. The camera flash selection may include one of an auto flash, flash on, and flash off, which may correspond to a camera flash setting of the external device. As the user contacts the flash affordance, the flash affordance changes from auto flash (1008), to flash on (1010), and flash off (1012). In some embodiments, the flash setting is transmitted to the external device at the time of selection. In some embodiments, the flash setting is transmitted to the external device with an image capture request.

Figure 11:
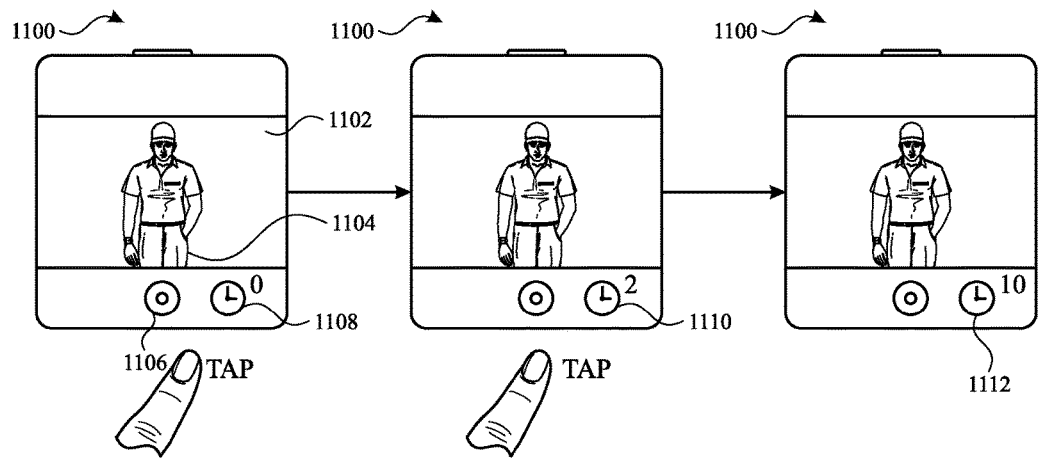
FIG. 11 illustrates exemplary user interfaces for providing remote camera control.

Attention is now directed to a remote camera control user interface that is displayed in some embodiments, with reference to FIG. 11. FIG. 11 shows exemplary user interface screen 1102 that device 1100 can display on touchscreen 1104. In some embodiments, device 1100 is device 500 (FIG. 5). User interface 1102 is a remote camera control user interface, and include an image feed 1104 received from a camera of an external device (e.g., a camera of device 100 in FIG. 4A). In some embodiments, remote camera control user interface 1102 is displayed in response to detecting a user's selection of a camera affordance from a user interface of device 1100.

In some embodiments, user interface 1102 includes timer affordance 1108. In response to detecting contact on timer affordance 1108, device 1000 transmits a timer setting selection to the external device. The timer setting selection includes one of a no timer, a two-second timer, and a ten-second timer, which may correspond to a timer setting of the external device. As the user contacts the timer affordance, the timer affordance changes from no timer (1108), a two-second timer (1110), or a ten-second timer (1112).

In some embodiments, the timer setting is transmitted to the external device upon detection of a contact on shutter affordance 1106. An image capture request associated with shutter affordance is delayed to account for the timer request; that is, device 1100 may transmit a request to the external device to immediately capture an image, only after device 1100 determines that the appropriate time has expired. In some embodiments, a requested image capture time is transmitted with the image capture request, wherein the requested image capture time accounts for a timer setting associated with the timer affordance.

In some embodiments, device 1100 displays a countdown to an image capture time in response to detection of a contact on shutter affordance 1106 and a non-zero timer setting. For example, for a two-second timer setting, device 1100 displays a count down from two seconds to one second to zero. In some embodiments, the count-down is displayed as a decreasingly-filled ring.

Figure 12:
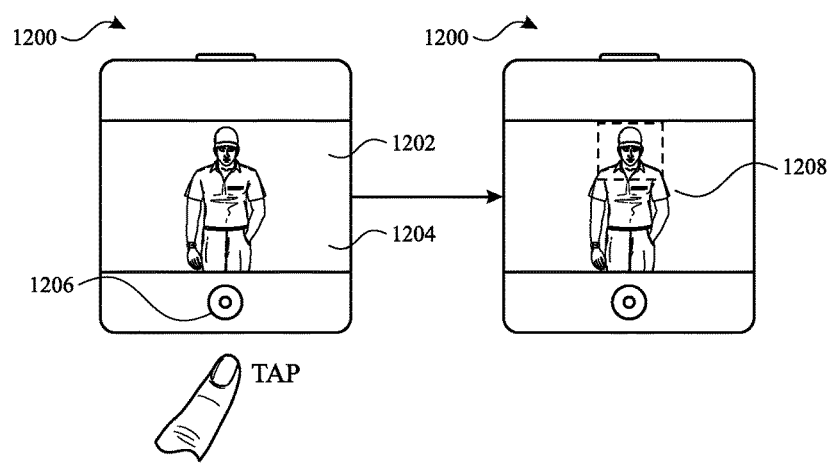
FIG. 12 illustrates exemplary user interfaces for providing remote camera control.

Attention is now directed to a remote camera control user interface that is displayed in some embodiments, with reference to FIG. 12. FIG. 12 shows exemplary user interface screen 1202 that device 1200 can display on touchscreen 1204. User interface screen 1202 includes a shutter affordance 1206. In some embodiments, device 1200 is device 500 (FIG. 5). User interface 1202 is a remote camera control user interface, and includes an image feed 1204 received from a camera of an external device (e.g., a camera of device 100 in FIG. 4A). In some embodiments, remote camera control user interface 1202 is displayed in response to detecting a user's selection of a camera affordance from a user interface of device 1200.

In response to a contact on image feed 1202 on touch screen 1204, device 1200 transmits a focus setting selection to the external device. Device 1200 provides a visual indication of the focus setting 1208. In the example provided in FIG. 12, a broken square depicts the selection of the focus setting, but other visual indications could be used without deviating from the scope of the claimed subject matter.

Figure 13:
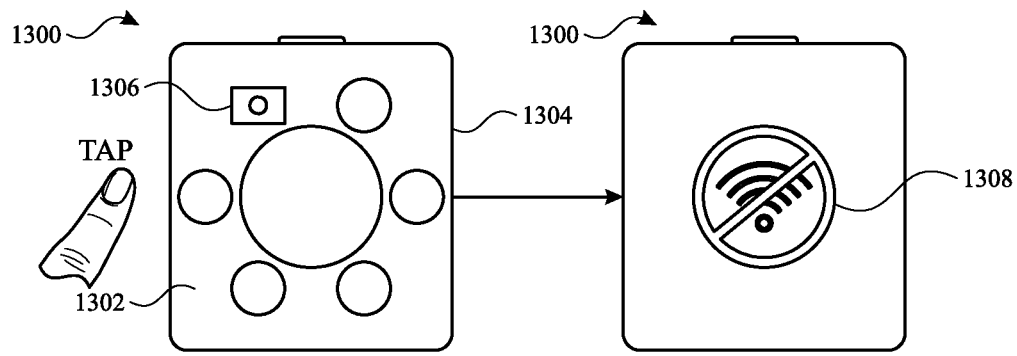
FIG. 13 illustrates exemplary user interfaces for providing remote camera control.

Attention is now directed to a remote camera control user interface that is displayed in some embodiments, with reference to FIG. 13. FIG. 13 shows exemplary user interface screen 1302 that device 1300 can display on touchscreen 1304. In some embodiments, device 1200 is device 500 (FIG. 5). Screen 1302 can be, for example, a home screen that appears when the display of device 600 is powered on, or that appears in response to user input on device 1300. Screen 1302 displays affordances that optionally launch software applications installed on device 1300.

Affordance 1306 may correspond to a remote camera control application in that the remote camera control application may launch in response to a user's selection of affordance 1306. A remote camera control application may enable a user of device 1300 to wirelessly control camera functions of an external device (e.g., a camera of device 100 in FIG. 4A).

A user may select affordance 1306 to launch the remote camera control application. In response to detecting a user's selection of affordance 1306 and determining that device 1300 is not wirelessly connected to an external device responsive to remote camera control, device 1300 displays screen 1308 which notifies the user that the external device is not available for remote camera control. In some embodiments, device 1300 displays captured images that are stored on device 1300, or stores flash, zoom, or timer settings for a future wireless connection with the external device. Display screen 1308 is exemplary and, as will be readily understood by a person having ordinary skill in the art, other images could be used to notify a user that the external device is not available for remote camera control.

Figure 14:
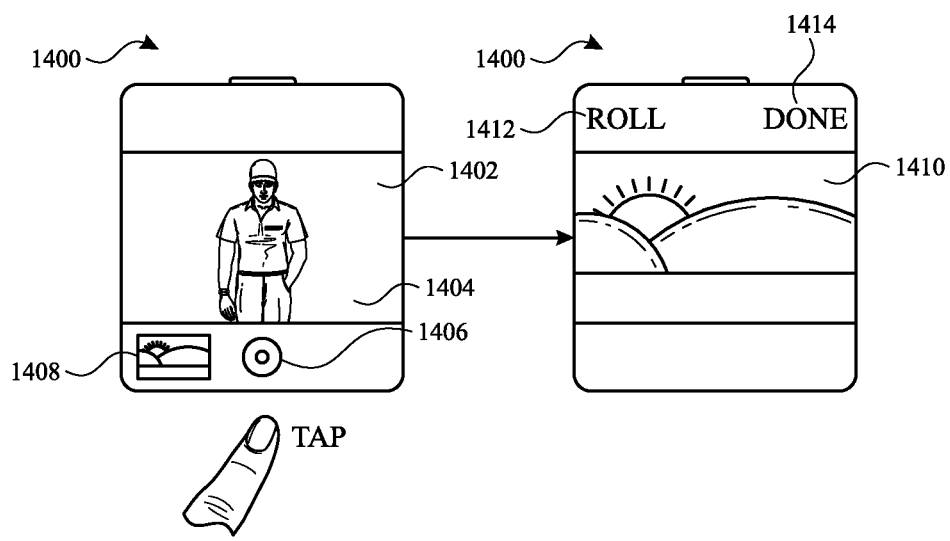
FIG. 14 illustrates exemplary user interfaces for providing remote camera control.

Attention is now directed to a remote camera control user interface that is displayed in some embodiments, with reference to FIG. 14. FIG. 14 shows exemplary user interface screen 1402 that device 1400 can display on touchscreen 1404. User interface screen 1402 includes a shutter affordance 1406. In some embodiments, device 1400 is device 500 (FIG. 5). User interface 1402 is a remote camera control user interface, and include an image feed 1404 received from a camera of an external device (e.g., a camera of device 100 in FIG. 4A) and an image preview affordance 1408. In some embodiments, remote camera control user interface 1402 is displayed in response to detecting a user's selection of a camera affordance from a user interface of device 1400.

In some embodiments, image preview affordance 1408 is a thumbnail of an image of a photo album of the external device. A user may select image preview affordance 1408. In response to detecting a selection of the image preview affordance, device 1400 displays one or more images 1410 of the photo album of the external device. Device 1400 optionally displays "Roll" affordance 1412. A user may select roll affordance 1412 to access more images of the photo album of the external device. In response to detecting a selection of roll affordance 1412, device 1400 display a plurality of images of the photo album of the external device.

Device 1400 optionally displays "Done" affordance 1414. A user may select done affordance 1414 to close the display of the one or more images of the photo album of the external device.

Although user interfaces 602, 608, 702, 802, 902, 1002, 1102, 1202, 1302, and 1402 have been described with respect to controlling camera features of an external device, it should be appreciated that these user interfaces can also be used for controlling a camera included with electronic devices 600, 700, 800, 900, 1000, 1100, 1200, 1300, or 1400. For example, user interfaces 602, 608, 702, 802, 902, 1002, 1102, 1202, 1302, and 1402 can be used to launch a camera application, capture an image, change zoom, change focus, change a zoom/focus setting associated with a rotatable input mechanism, change a flash, change a timer, or preview captured images of a camera included with electronic devices 600, 700, 800, 900, 1000, 1100, 1200, 1300, or 1400.

FIG. 15 is a flow diagram illustrating process 1500 for providing a remote camera control user interface. In some embodiments, process 1500 is performed at an electronic device with a display (e.g., 112, 340, 504, 1802) and a rotatable input mechanism (e.g., 506, 620, 708, 808, 908). In some embodiments, the electronic device also includes a touch-sensitive surface (e.g., 112, 355, 504, 1804). Some operations in process 1500 may be combined, the order of some operations may be changed, and some operations may be omitted.

Process 1500 provides an intuitive way to remotely control a camera of an external device. A user can retain control of the camera operations, while being included in the captured image. The process reduces the cognitive burden on a user when using a device to control a camera of an external device, thereby creating a more efficient human-machine interface. The process allows a user to evaluate a scene with the user in it, especially a scene that cannot be captured by holding and reversing a camera (e.g. a "selfie"). Process 1500 may also improve the quality of captured images—a later viewer of the captured image(s) is not reminded of the process of taking the picture, thereby providing a more causal and natural captured image. For battery-operated computing devices, enabling a user control a camera of an external device more quickly and more efficiently conserves power and increases the time between battery charges.

At block 1502, a camera affordance (e.g., 606, 1306) is displayed on the touch-sensitive display. At block 1504, a contact on the displayed camera affordance (e.g., 606, 1306) is detected. At block 1506, a determination is made as to whether the electronic device is wirelessly connected to an external device responsive to remote camera control. At block 1508, responsive at least in part to detecting the contact and determining the electronic device is wirelessly connected to the external device, a remote camera user-interface (e.g., 608, 702, 902, 902, 1002, 1102, 1202, and 1402) is displayed, wherein the remote camera user-interface (e.g., 608, 702, 902, 902, 1002, 1102, 1202, and 1402) comprises a shutter affordance (e.g., 612, 706, 806, 906, 1006, 1106, and 1206). At block 1510, data representing an image feed from a camera of the external device is received. At block 1512, the image feed is displayed (e.g., 610, 704, 804, 904) in the remote camera user-interface (e.g., 608, 702, 902, 902, 1002, 1102, 1202, and 1402). At block 1514, a contact is detected on the shutter affordance (e.g., 612, 706, 806, 906, 1006, 1106, and 1206). At block 1516, responsive at least in part to detecting the contact on the shutter affordance (e.g., 612, 706, 806, 906, 1006, 1106, and 1206), an image capture request is transmitted to the external device, wherein the image capture request is associated with an image capture time. At block 1518, the display of the image feed is ended before the image capture time. Optionally, at block 1518, the display of the remote camera user-interface is replaced with a display of a screen selected from the group consisting of a home screen, a blank screen, and a watch face. Optionally, at block 1518, the display is turned off.

FIG. 16 is a flow diagram illustrating process 1600 for providing a remote camera control user interface. In some embodiments, process 1600 is performed at an electronic device with a display (e.g., 112, 340, 504, 1802) and a rotatable input mechanism (e.g., 506, 620, 708, 808, 908). In some embodiments, the electronic device also includes a touch-sensitive surface (e.g., 112, 355, 504, 1804). Some operations in process 1600 may be combined, the order of some operations may be changed, and some operations may be omitted.

Process 1600 provides an intuitive way to remotely control a camera of an external device. A user can retain control of the camera operations, while being included in the captured image. The process reduces the cognitive burden on a user when using a device to control a camera of an external device, thereby creating a more efficient human-machine interface. The process allows a user to evaluate a scene with the user in it, especially a scene that cannot be captured by holding and reversing a camera (e.g. a "selfie"). In some optional embodiments, process 1600 reduces wireless communication with an external device and limit expenditure of processing resources of the external device. In some optional embodiments, process 1600 provides the user with a real-time view of the camera's zoomed in image. For battery-operated computing devices, enabling a user control a camera of an external device more quickly and more efficiently conserves power and increases the time between battery charges.

At block 1602, a camera affordance (e.g., 606, 1306) is displayed on the touch-sensitive display. At block 1604, a contact on the displayed camera affordance (e.g., 606, 1306) is detected. At block 1606, a determination is made as to whether the electronic device is wirelessly connected to an external device responsive to remote camera control. At block 1608, responsive at least in part to detecting the contact and determining the electronic device is wirelessly connected to the external device, a remote camera user-interface (e.g., 608, 702, 902, 902, 1002, 1102, 1202, 1402) is displayed. At block 1610, data representing an image feed from a camera of the external device is received. At block 1612, the image feed is displayed (e.g., 610, 704, 804, 904) in the remote camera user-interface (e.g., 608, 702, 902, 902, 1002, 1102, 1202, 1402). At block 1614, movement of the rotatable input mechanism (e.g., 506, 620, 708, 808, 908) is detected. At block 1616, responsive at least in part to detection of movement of the rotatable input mechanism (e.g., 506, 620, 708, 808, 908), a display of the image feed is resized (e.g., 712). Optionally, at block 1616, a zoom setting selection is transmitted to the external device. Optionally, at block 1616, a contact on a shutter affordance (e.g., 612, 706, 806, 906, 1006, 1106, and 1206) of the user interface is detected and, at least partially in response to detecting a contact on the shutter affordance (e.g., 612, 706, 806, 906, 1006, 1106, and 1206), an image capture request and a zoom setting selection are transmitted to the external device.

FIG. 17 is a flow diagram illustrating process 1700 for providing a remote camera control user interface. In some embodiments, process 1700 is performed at an electronic device with a display (e.g., 112, 340, 504, 1802) and a rotatable input mechanism (e.g., 506, 620, 708, 808, 908). In some embodiments, the electronic device also includes a touch-sensitive surface (e.g., 112, 355, 504, 1804). Some operations in process 1700 may be combined, the order of some operations may be changed, and some operations may be omitted.

Process 1700 provides an intuitive way to remotely control a camera of an external device. A user can retain control of the camera operations, while being included in the captured image. The process reduces the cognitive burden on a user when using a device to control a camera of an external device, thereby creating a more efficient human-machine interface. The process allows a user to evaluate a scene with the user in it, especially a scene that cannot be captured by holding and reversing a camera (e.g. a "selfie"). For battery-operated computing devices, enabling a user control a camera of an external device more quickly and more efficiently conserves power and increases the time between battery charges.

At block 1702, a camera affordance (e.g., 606, 1306) is displayed on the touch-sensitive display. At block 1704, a contact on the displayed camera affordance (e.g., 606, 1306) is detected. At block 1706, a determination is made as to whether the electronic device is wirelessly connected to an external device responsive to remote camera control. At block 1708, responsive at least in part to detecting the contact and determining the electronic device is wirelessly connected to the external device, a remote camera user-interface (e.g., 608, 702, 902, 902, 1002, 1102, 1202, and 1402) is displayed. At block 1710, data representing an image feed from a camera of the external device is received. At block 1712, the image feed is displayed (e.g., 610, 704, 804, 904) in the remote camera user-interface (e.g., 608, 702, 902, 902, 1002, 1102, 1202, and 1402). At block 1714, movement of the rotatable input mechanism (e.g., 506, 620, 708, 808, 908) is detected. At block 1716, responsive at least in part to detection of movement of the rotatable input mechanism (e.g., 506, 620, 708, 808, 908), a focus setting selection is transmitted to the external device. Optionally, at block 1716, a contact on a shutter affordance (e.g., 612, 706, 806, 906, 1006, 1106, and 1206) of the user interface is detected and, at least partially in response to detecting a contact on the shutter affordance (e.g., 612, 706, 806, 906, 1006, 1106, and 1206), an image capture request and the focus setting selection are transmitted to the external device.

It should be understood that the particular order in which the operations in FIGS. 15-17 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 1500-1700 (FIGS. 15-17) may be incorporated with one another. For brevity, the permutations of user input techniques are not repeated.

The operations described above with reference to FIGS. 15-17 are, optionally, implemented by components depicted in FIGS. 1A-1B, 5A-5B, and 18. For example, operations 1504, 1506, 1508, 1514, 1516, 1518, 1604, 1606, 1608, 1614, 1616, 1704, 1706, 1708, 1714, and 1716 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 5A-5B and 18.

It should also be understood that the embodiments described above with respect to FIGS. 6-17 may be complemented by additional features. For example, the embodiments may be complimented with methods and systems for displaying elements in greater detail and accessing information on a device, including the methods and systems described in U.S. Pat. No. 8,773,470, issued on Jul. 8, 2014 (filed May 7, 2010 as U.S. patent application Ser. No. 12/776,331), titled "Systems and methods for displaying visual information on a device," which is incorporated herein by reference in its entirety.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 5A, 5B, and 18) are all included within the scope of protection of the invention.

Figure 18:
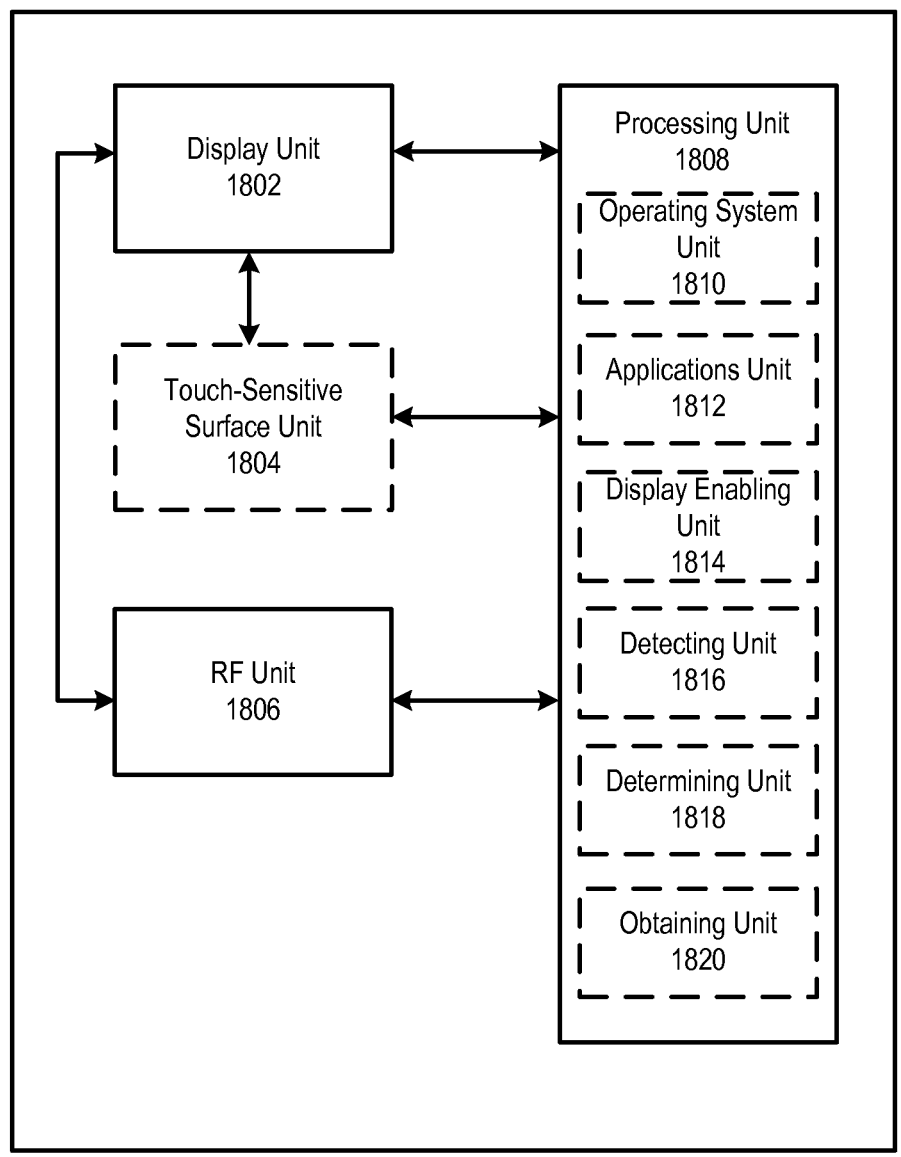
FIG. 18 is a functional block diagram of an electronic device in accordance with some embodiments.

FIG. 18 shows exemplary functional blocks of an electronic device 1800 that, in some embodiments, performs the features described above. As shown in FIG. 18, an electronic device 1800 includes a display unit 1802 configured to display graphical objects; a touch-sensitive surface unit 1804 configured to receive user gestures; one or more RF units 1806 configured to detect and communicate with external electronic devices; and a processing unit 1808 coupled to display unit 1802, touch-sensitive surface unit 1804, and RF unit(s) 1806. In some embodiments, processing unit 1808 is configured to support an operating system 1810 for launching and running one or more applications 1812.

In some embodiments, the processing unit 1808 includes a display enabling unit 1814, a detecting unit 1816, a determining unit 1818, and an obtaining unit 1820. In some embodiments, the display enabling unit 1814 is configured to cause a display of a user interface (or portions of a user interface) in conjunction with the display unit 1802. For example, the display enabling unit 1814 may be used for: displaying an affordance, displaying a user interface screen or a portion thereof, displaying a wallpaper, displaying indications (such as indications of temperature or location), displaying remote camera control user interfaces, displaying a grid or a plurality of regions, and displaying an image. In some embodiments, the detecting unit 1816 is configured to receive input, e.g., through the use of touch-sensitive surface unit 1804. For example, the detecting unit 1816 may be used for: detecting a contact, detecting movement of the rotatable input mechanism, and detecting a swipe. In some embodiments, the determining unit 1818 is configured to make determinations. For example, determining unit 1818 may be used for: determining whether a user input is movement of the rotatable input mechanism or a swipe on the touch-sensitive display, and determining that an activity is to begin with a threshold amount of time. In some embodiments, the obtaining unit 1820 is configured to obtain information. For example, the obtaining unit 1820 may be used for obtaining camera data from an external device, including an image feed and captured images of a photo album of the external device. The units of FIG. 18 may be used to implement the various techniques and methods described above with respect to FIGS. 6-17.

The functional blocks of the device 1800 are, optionally, implemented by hardware, software, or a combination of hardware and software to carry out the principles of the various described examples. It is understood by persons of skill in the art that the functional blocks described in FIG. 18 are, optionally, combined or separated into sub-blocks to implement the principles of the various described examples. Therefore, the description herein optionally supports any possible combination or separation or further definition of the functional blocks described herein.

Figure 19:
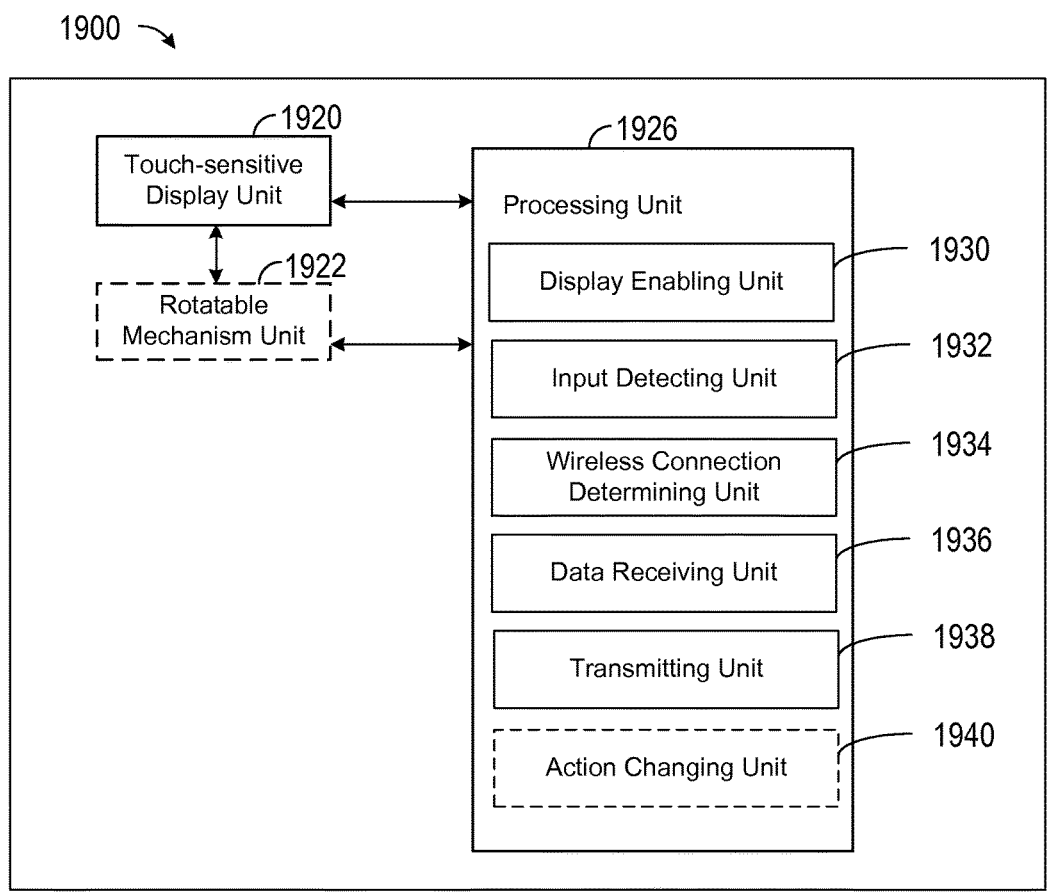
FIG. 19 is a functional block diagram of an electronic device in accordance with some embodiments.

In accordance with some embodiments, FIG. 19 shows an exemplary functional block diagram of an electronic device

1900 configured in accordance with the principles of the various described embodiments. In accordance with some embodiments, the functional blocks of electronic device 1900 are configured to perform the techniques described above. The functional blocks of the device 1900 are, optionally, implemented by hardware, software, or a combination of hardware and software to carry out the principles of the various described examples. It is understood by persons of skill in the art that the functional blocks described in FIG. 19 are, optionally, combined or separated into sub-blocks to implement the principles of the various described examples. Therefore, the description herein optionally supports any possible combination or separation or further definition of the functional blocks described herein.

As shown in FIG. 19, an electronic device 1900 includes a touch-sensitive display unit 1920 configured to display a graphic user interface, and a processing unit 1926 coupled to touch-sensitive display unit 1920. In some embodiments, processing unit 1926 includes a display enabling unit 1930, an input detecting unit 1932, a wireless connection determining unit 1934, a data receiving unit 1936, and a transmitting unit 1938. Optionally, electronic device 1900 also includes a rotatable mechanism unit 1922, which is coupled to processing unit 1926. Optionally, processing unit 1926 also includes an action changing unit 1940.

Processing unit 1926 is configured to: enable (e.g., with display enabling unit 1930) display of a camera affordance on touch-sensitive display unit 1920; detect (e.g., with input detecting unit 1932) a gesture at a location corresponding to the camera affordance; determine (e.g., with wireless connection determining unit 1934) whether electronic device 1900 is wirelessly connected to an external device responsive to remote camera control; in accordance with a determination that electronic device 1900 is wirelessly connected to the external device and in response to the detection of a gesture at a location corresponding to the camera affordance: enable (e.g., with display enabling unit 1930) display of a remote camera user-interface on touch-sensitive display unit 1920, wherein the remote camera user-interface comprises a shutter affordance; receive (e.g., with data receiving unit 1936) data representing an image feed from a camera of the external device; and enable (e.g., with display enabling unit 1930) display of the image feed in the remote camera user-interface. Processing unit 1924 is further configured to: detect (e.g., with input detecting unit 1932) a gesture at a location corresponding to the shutter affordance; and in response to the detection of a gesture at a location corresponding to the shutter affordance: transmit (e.g., with transmitting unit 1938) an image capture request to the external device, the image capture request associated with an image capture time; and end (e.g., with display enabling unit 1930) the display of the image feed before the image capture time.

In some embodiments, ending the display of the image feed comprises replacing (e.g., with display enabling unit 1930) the display of the remote camera user-interface with a display of a screen selected from the group consisting of a home screen, a blank screen, and a watch face.

In some embodiments, ending the display of the image feed comprises turning off (e.g., with display enabling unit 1930) touch-sensitive display unit 1920.

In some embodiments, electronic device 1900 further comprises a rotatable input mechanism unit 1922. Processing unit is further configured to: detect (e.g., with input detecting unit 1932) movement of rotatable input mechanism unit 1922; and in response to the detection of movement of rotatable input mechanism unit 1922: resize (e.g., with display enabling unit 1930) the display of the image feed in the remote camera user-interface.

In some embodiments, processing unit 1926 is further configured to: in response to the detection of movement of rotatable input mechanism unit 1922: transmit (e.g., with transmitting unit 1938) a zoom setting selection to the external device.

In some embodiments, processing unit 1926 is further configured to: in response to the detection of a gesture at a location corresponding to the shutter affordance: transmit (e.g., with transmitting unit 1938) the zoom setting selection with the image capture request.

In some embodiments, processing unit 1926 is further configured to: in response to the detection of movement of rotatable input mechanism unit 1922: transmit (e.g., with transmitting unit 1938) a focus setting selection to the external device.

In some embodiments, the remote camera user-interface comprises a toggle affordance, and processing unit 1926 is further configured to: detect (e.g., with input detecting unit 1932) a gesture at a location corresponding to the toggle affordance; and in response to the detection of a gesture at a location corresponding to the toggle affordance: change (with action changing unit 1940) an action associated with detecting movement of rotatable input mechanism unit 1922, wherein the action comprises one of resizing (e.g., with display enabling unit 1930) the display of the image feed in the remote camera user-interface and transmitting (e.g., with transmitting unit 1938) a focus setting selection to the external device.

In some embodiments, processing unit 1926 is further configured to: detect (e.g., with input detecting unit 1932) a gesture at a location corresponding to the display of the image feed; and in response to the detection of a gesture at a location corresponding to the display of the image feed: transmit (e.g., with transmitting unit 1938) a focus setting selection to the external device.

In some embodiments, the remote camera user-interface comprises a flash affordance, and processing unit 1926 is further configured to: detect (e.g., with input detecting unit 1932) a gesture at a location corresponding to the flash affordance; and in response to the detection of a gesture at a location corresponding to the flash affordance: transmit (e.g., with transmitting unit 1938) a camera flash selection to the external device, wherein the camera flash selection comprises an auto/on/off setting of a camera flash of the external device.

In some embodiments, the remote camera user-interface comprises a timer affordance, and processing unit 1926 is further configured to: detect (e.g., with input detecting unit 1932) a gesture at a location corresponding to the timer affordance; and in response to the detection of a gesture at a location corresponding to the timer affordance and to the detection of a gesture at a location corresponding to the shutter affordance: delay transmission (e.g., with transmitting unit 1938) of the image capture request.

In some embodiments, delaying transmission of the image capture request comprises delaying the transmission by one selected from a two-second delay and a ten-second delay.

In some embodiments, the remote camera user-interface comprises a timer affordance, and processing unit 1926 is further configured to: detect (e.g., with input detecting unit 1932) a gesture at a location corresponding to the timer affordance; and in response to the detection of a gesture at a location corresponding to the timer affordance and to the detection of a gesture at a location corresponding to the shutter affordance: transmit (e.g., with transmitting unit 1938) a requested image capture time with the image capture request, wherein the requested image capture time accounts for a timer setting associated with the timer affordance.

In some embodiments, the timer setting is one selected from a two-second timer setting and a ten-second timer setting.

In some embodiments, processing unit 1926 is further configured to: in response to the detection of a gesture at a location corresponding to the shutter affordance, enable (e.g., with display enabling unit 1930) display of a countdown to the image capture time.

In some embodiments, processing unit 1926 is further configured to: in accordance with a determination that electronic device 1900 is not wirelessly connected to the external device and in response to the detection of a gesture at a location corresponding to the camera affordance, enable (e.g., with display enabling unit 1930) display of a notification that the external device is not available for remote camera control.

In some embodiments, processing unit 1926 is further configured to: further in accordance with a determination that electronic device 1900 is not wirelessly connected to the external device and in response to the detection of a gesture at a location corresponding to the camera affordance: enable (e.g., with display enabling unit 1930) display of an image preview affordance; and detect (e.g., with input detecting unit 1932) a gesture at a location corresponding to the image preview affordance. Processing unit 1926 is further configured to: in response to the detection of a gesture at a location corresponding to the image preview affordance: enable (e.g., with display enabling unit 1930) display of one or more images of a photo album stored on electronic device 1900.

In some embodiments, the remote camera user-interface comprises an image preview affordance, and processing unit 1926 is further configured to: detect (e.g., with input detecting unit 1932) a gesture at a location corresponding to the image preview affordance; and in response to the detection of a gesture at a location corresponding to the image preview affordance: enable (e.g., with display enabling unit 1930) display of one or more images of a photo album of the external device.

In some embodiments, the image preview affordance comprises a thumbnail of an image of the photo album of the external device.

In some embodiments, the image capture request comprises a requested image capture time.

In some embodiments, ending the display of the image feed occurs prior to transmitting the image capture request to the external device.

In some embodiments, detecting a gesture at a location corresponding to the camera affordance comprises detecting a contact on the camera affordance and detecting liftoff of the contact.

The operations described above with reference to FIG. 15 are, optionally, implemented by components depicted in FIGS. 1A-1B or FIG. 19. For example, displaying operation 1502, contact detecting operation 1504, and determining operation 1506 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20:
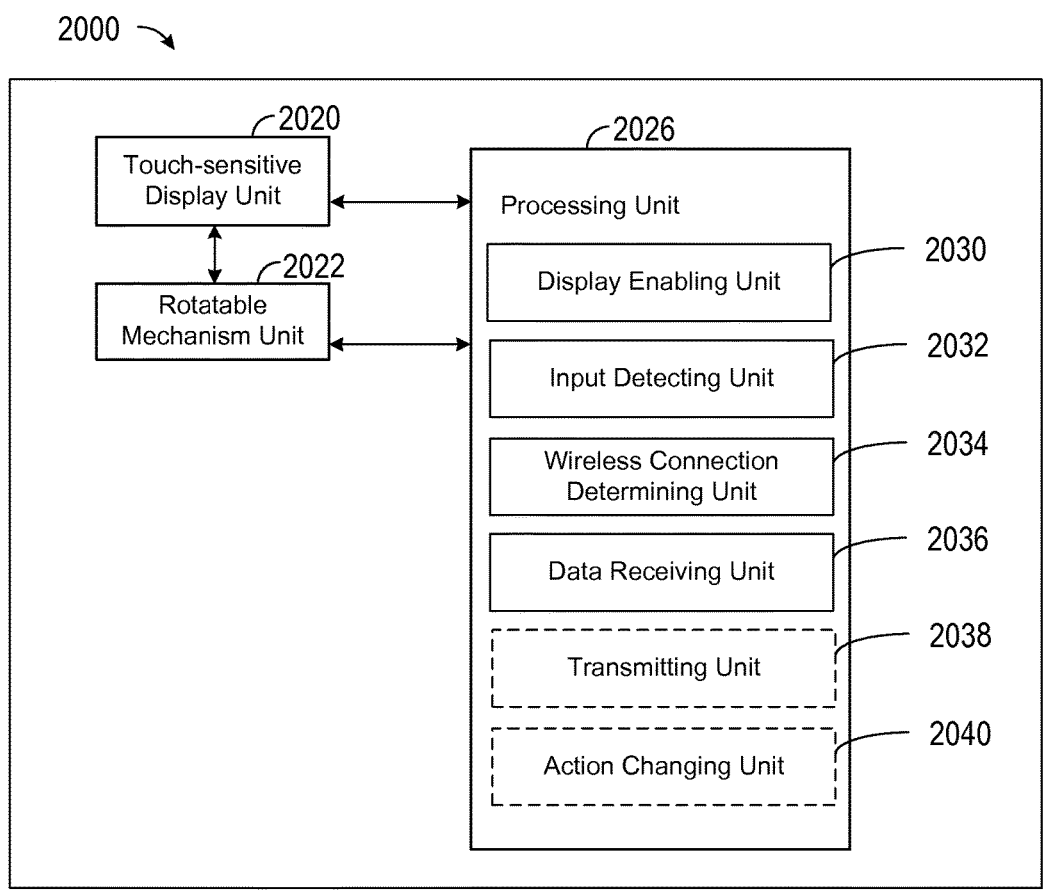
FIG. 20 is a functional block diagram of an electronic device in accordance with some embodiments.

In accordance with some embodiments, FIG. 20 shows an exemplary functional block diagram of an electronic device 2000 configured in accordance with the principles of the various described embodiments. In accordance with some embodiments, the functional blocks of electronic device 2000 are configured to perform the techniques described above. The functional blocks of the device 2000 are, optionally, implemented by hardware, software, or a combination of hardware and software to carry out the principles of the various described examples. It is understood by persons of skill in the art that the functional blocks described in FIG. 20 are, optionally, combined or separated into sub-blocks to implement the principles of the various described examples. Therefore, the description herein optionally supports any possible combination or separation or further definition of the functional blocks described herein.

As shown in FIG. 20, an electronic device 2000 includes a touch-sensitive display unit 2020 configured to display a graphic user interface, a rotatable mechanism unit 2022, and a processing unit 2026 coupled to touch-sensitive display unit 2020 and rotatable mechanism unit 2022. In some embodiments, processing unit 2026 includes a display enabling unit 2030, an input detecting unit 2032, a wireless connection determining unit 2034, and a data receiving unit 2036. Optionally, processing unit 2026 also includes a transmitting unit 2038 and an action changing unit 2040.

Processing unit 2026 is configured to: enable (e.g., with display enabling unit 2030) display of a camera affordance on touch-sensitive display unit 2020; detect (e.g., with input detecting unit 2032) a gesture at a location corresponding to the camera affordance; determine (e.g., with wireless connection determining unit 2034) whether electronic device 2000 is wirelessly connected to an external device responsive to remote camera control; in accordance with a determination that electronic device 2000 is wirelessly connected to the external device and in response to the detection of a gesture at a location corresponding to the camera affordance: enable (e.g., with display enabling unit 2030) display of a remote camera user-interface on touch-sensitive display unit 2020; receive (e.g., with data receiving unit 2036) data representing an image feed from a camera of the external device; and enable (e.g., with display enabling unit 2030) display of the image feed in the remote camera user-interface. Processing unit 2026 is further configured to: detect (e.g., with input detecting unit 2032) movement of rotatable input mechanism unit 2022; and in response to the detection of movement of rotatable input mechanism unit 2022: resize (e.g., with display enabling unit 2030) a display of the image feed in the remote camera user-interface.

In some embodiments, processing unit 2026 is further configured to: in response to the detection of movement of rotatable input mechanism unit 2022: transmit (e.g., with transmitting unit 2038) a zoom setting selection to the external device.

In some embodiments, the remote camera user-interface comprises a shutter affordance, and processing unit 2026 is further configured to: detect (e.g., with input detecting unit 2032) a gesture at a location corresponding to the shutter affordance; and in response to the detection of a gesture at a location corresponding to the shutter affordance: transmit (e.g., with transmitting unit 2038) an image capture request to the external device; and transmit (e.g., with transmitting unit 2038) the zoom setting selection with the image capture request.

In some embodiments, the remote camera user-interface comprises a toggle affordance, and processing unit 2026 is further configured to: detect (e.g., with input detecting unit 2032) a gesture at a location corresponding to the toggle affordance; and in response to the detection of a gesture at a location corresponding to the toggle affordance: change (e.g., with action changing unit 2040) an action associated with detecting movement of rotatable input mechanism unit 2022, wherein the action comprises one of resizing (e.g., with display enabling unit 2030) the display of the image feed in the remote camera user-interface and transmitting (e.g., with transmitting unit 2038) a focus setting selection to the external device.

In some embodiments, processing unit 2026 is further configured to: detect (e.g., with input detecting unit 2032) a gesture at a location corresponding to the display of the image feed; and in response to the detection of a gesture at a location corresponding to the display of the image feed: transmit (e.g., with transmitting unit 2038) a focus setting selection to the external device.

In some embodiments, the remote camera user-interface comprises a shutter affordance, and processing unit 2026 is further configured to: detect (e.g., with input detecting unit 2032) a gesture at a location corresponding to the shutter affordance; and in response to the detection of a gesture at a location corresponding to the shutter affordance: transmit (e.g., with transmitting unit 2038) an image capture request to the external device.

In some embodiments, the remote camera user-interface comprises a shutter affordance, and processing unit 2026 is further configured to: detect (e.g., with input detecting unit 2032) a gesture at a location corresponding to the shutter affordance; and in response to the detection of a gesture at a location corresponding to the shutter affordance: transmit (e.g., with transmitting unit 2038) an image capture request to the external device, the image capture request associated with an image capture time; and end (e.g., with display enabling unit 2030) the display of the image feed before the image capture time.

In some embodiments, the image capture request comprises a requested image capture time.

In some embodiments, ending the display of the image feed occurs prior to transmitting the image capture request to the external device.

In some embodiments, the remote camera user-interface comprises a flash affordance, and processing unit 2026 is further configured to: detect (e.g., with input detecting unit 2032) a gesture at a location corresponding to the flash affordance; and in response to the detection of a gesture at a location corresponding to the flash affordance: transmit (e.g., with transmitting unit 2038) a camera flash selection to the external device, wherein the camera flash selection comprises an auto/on/off setting of a camera flash of the external device.

In some embodiments, the remote camera user-interface comprises a timer affordance and a shutter affordance, and processing unit 2026 is further configured to: detect (e.g., with input detecting unit 2032) a gesture at a location corresponding to the timer affordance; detect (e.g., with input detecting unit 2032) a gesture at a location corresponding to the shutter affordance; and in response to the detection of a gesture at a location corresponding to the timer affordance and to the detection of a gesture at a location corresponding to the shutter affordance: delay (e.g., with transmitting unit 2038) transmission of the image capture request.

In some embodiments, delaying transmission of the image capture request comprises delaying the transmission by one selected from a two-second delay and a ten-second delay.

In some embodiments, the remote camera user-interface comprises a timer affordance and a shutter affordance, and processing unit 2026 is further configured to: detect (e.g., with input detecting unit 2032) a gesture at a location corresponding to the timer affordance; detect (e.g., with input detecting unit 2032) a gesture at a location corresponding to the shutter affordance; and in response to the detection of a gesture at a location corresponding to the timer affordance and to the detection of a gesture at a location corresponding to the shutter affordance: transmit (e.g., with transmitting unit 2038) a requested image capture time with an image capture request, wherein the requested image capture time accounts for a timer setting associated with the timer affordance.

In some embodiments, the timer setting is one selected from a two-second timer setting and a ten-second timer setting.

In some embodiments, processing unit 2026 is further configured to: in response to the detection of a gesture at a location corresponding to the shutter affordance: enable (e.g., with display enabling unit 2030) display of a countdown to the image capture time.

In some embodiments, the remote camera user-interface comprises an image preview affordance, and processing unit 2026 is further configured to: detect (e.g., with input detecting unit 2032) a gesture at a location corresponding to the image preview affordance; and in response to the detection of a gesture at a location corresponding to the image preview affordance: enable (e.g., with display enabling unit 2030) display of one or more images of a photo album of the external device.

In some embodiments, the image preview affordance comprises a thumbnail of an image of the photo album of the external device.

In some embodiments, processing unit 2026 is further configured to: in accordance with a determination that electronic device 2000 is not wirelessly connected to the external device and in response to the detection of a gesture at a location corresponding to the camera affordance: enable (e.g., with display enabling unit 2030) display of a notification that the external device is not responsive to remote camera control.

In some embodiments, processing unit 2026 is further configured to: further in accordance with a determination that electronic device 2000 is not wirelessly connected to the external device and in response to the detection of a gesture at a location corresponding to the camera affordance: enable (e.g., with display enabling unit 2030) display of an image preview affordance; and detect (e.g., with input detecting unit 2032) a gesture at a location corresponding to the image preview affordance. Processing unit 2026 is further configured to: in response to the detection of a gesture at a location corresponding to the image preview affordance: enable (e.g., with display enabling unit 2030) display of one or more images of a photo album stored on electronic device 2000.

In some embodiments, detecting a gesture at a location corresponding to the camera affordance comprises detecting (e.g., with input detecting unit 2032) a contact on the camera affordance and detecting (e.g., with input detecting unit 2032) liftoff of the contact.

The operations described above with reference to FIG. 16 are, optionally, implemented by components depicted in FIGS. 1A-1B or FIG. 20. For example, displaying operation 1602, contact detecting operation 1604, and determining operation 1606 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 21:
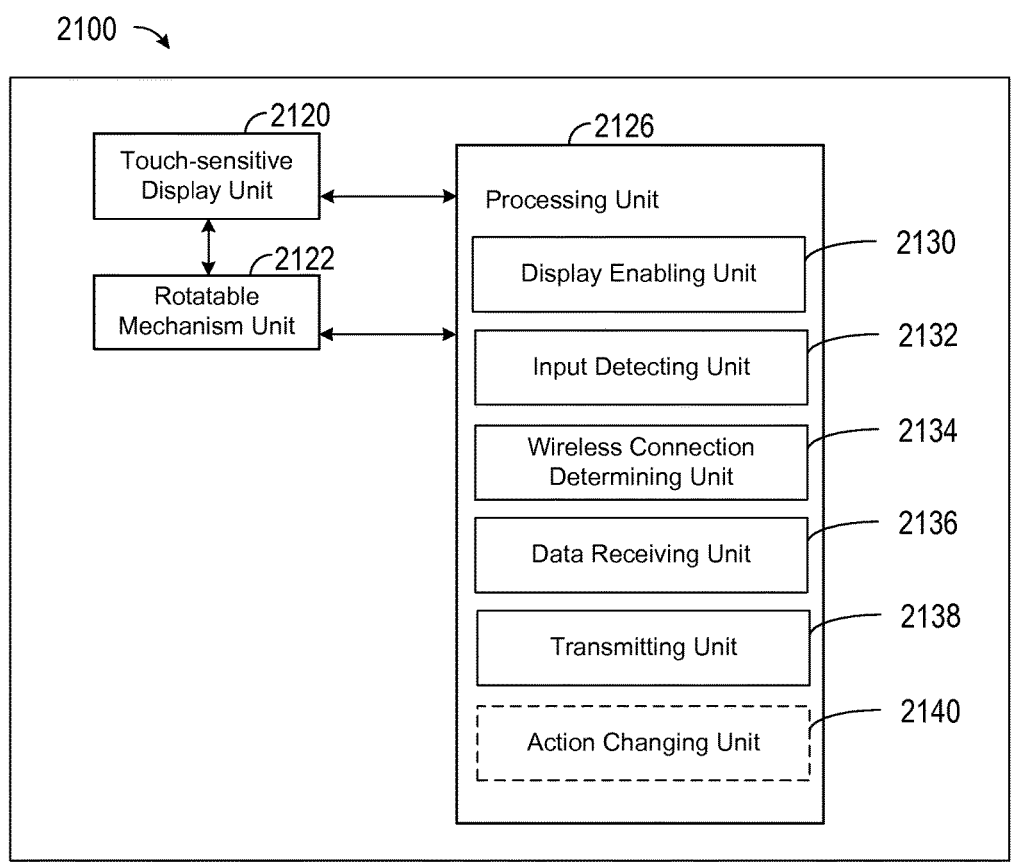
FIG. 21 is a functional block diagram of an electronic device in accordance with some embodiments.

In accordance with some embodiments, FIG. 21 shows an exemplary functional block diagram of an electronic device 2100 configured in accordance with the principles of the various described embodiments. In accordance with some embodiments, the functional blocks of electronic device 2100 are configured to perform the techniques described above. The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

As shown in FIG. 21, an electronic device 2100 includes a touch-sensitive display unit 2120 configured to display a graphic user interface, a rotatable mechanism unit 2122, and a processing unit 2126 coupled to touch-sensitive display unit 2120 and rotatable mechanism unit 2122. In some embodiments, processing unit 2126 includes a display enabling unit 2130, an input detecting unit 2132, a wireless connection determining unit 2134, a data receiving unit 2136 and a transmitting unit 2138. Optionally, processing unit 2126 also includes an action changing unit 2140.

Processing unit 2126 is configured to: enable (e.g., with display enabling unit 2130) display of a camera affordance on touch-sensitive display unit 2120; detect (e.g., with input detecting unit 2132) a gesture at a location corresponding to the camera affordance; determine (e.g., with wireless connection determining unit 2134) whether electronic device 2100 is wirelessly connected to an external device responsive to remote camera control; in accordance with a determination that electronic device 2100 is wirelessly connected to the external device and in response to the detection of a gesture at a location corresponding to the camera affordance: enable (e.g., with display enabling unit 2130) display of a remote camera user-interface on touch-sensitive display unit 2120; receive (e.g., with data receiving unit 2136) data representing an image feed from a camera of the external device; and enable (e.g., with display enabling unit 2130) display of the image feed in the remote camera user-interface. Processing unit 2126 is further configured to: detect movement of rotatable input mechanism unit 2122; and in response to the detection of movement of rotatable input mechanism unit 2122: transmit (e.g., with transmitting unit 2138) a focus setting selection to the external device.

In some embodiments, the remote camera user-interface comprises a shutter affordance, and processing unit 2126 is further configured to: detect (e.g., with input detecting unit 2132) a gesture at a location corresponding to the shutter affordance; and in response to the detection of a gesture at a location corresponding to the shutter affordance: transmit (e.g., with transmitting unit 2138) an image capture request to the external device, the image capture request associated with an image capture time; and transmit (e.g., with transmitting unit 2138) the focus setting selection with the image capture request.

In some embodiments, the remote camera user-interface comprises a toggle affordance, and processing unit 2126 is further configured to: detect (e.g., with input detecting unit 2132) a gesture at a location corresponding to the toggle affordance; and in response to the detection of a gesture at a location corresponding to the toggle affordance: change (e.g., with action changing unit 2140) an action associated with detecting movement of rotatable input mechanism unit 2122, wherein the action comprises one of resizing the display of the image feed in the remote camera user-interface and transmitting a focus setting selection to the external device.

In some embodiments, processing unit 2126 is further configured to: detect (e.g., with input detecting unit 2132) a gesture at a location corresponding to the display of the image feed; and in response to the detection of a gesture at a location corresponding to the display of the image feed: transmit (e.g., with transmitting unit 2138) a focus setting selection to the external device.

In some embodiments, the remote camera user-interface comprises a shutter affordance, and processing unit 2126 is further configured to: detect (e.g., with input detecting unit 2132) a gesture at a location corresponding to the shutter affordance; and in response to the detection of a gesture at a location corresponding to the shutter affordance: transmit (e.g., with transmitting unit 2138) an image capture request to the external device.

In some embodiments, the remote camera user-interface comprises a shutter affordance, and processing unit 2126 is further configured to: detect (e.g., with input detecting unit 2132) a gesture at a location corresponding to the shutter affordance; and in response to the detection of a gesture at a location corresponding to the shutter affordance: transmit (e.g., with transmitting unit 2138) an image capture request to the external device, the image capture request associated with an image capture time; and end (e.g., with display enabling unit 2130) the display of the image feed before the image capture time.

In some embodiments, the image capture request comprises a requested image capture time.

In some embodiments, ending the display of the image feed occurs prior to transmitting the image capture request to the external device.

In some embodiments, the remote camera user-interface comprises a flash affordance, and processing unit 2126 is further configured to: detect (e.g., with input detecting unit 2132) a gesture at a location corresponding to the flash affordance; and in response to the detection of a gesture at a location corresponding to the flash affordance: transmit (e.g., with transmitting unit 2138) a camera flash selection to the external device, wherein the camera flash selection comprises an auto/on/off setting of a camera flash of the external device.

In some embodiments, the remote camera user-interface comprises a timer affordance and a shutter affordance, and processing unit 2126 is further configured to: detect (e.g., with input detecting unit 2132) a gesture at a location corresponding to the timer affordance; detect (e.g., with input detecting unit 2132) a gesture at a location corresponding to the shutter affordance; and in response to the detection of a gesture at a location corresponding to the timer affordance and to the detection of a gesture at a location corresponding to the shutter affordance: delay (e.g., with transmitting unit 2138) transmission of the image capture request.

In some embodiments, delaying transmission of the image capture request comprises delaying the transmission by one selected from a two-second delay and a ten-second delay.

In some embodiments, the remote camera user-interface comprises a timer affordance and a shutter affordance, and processing unit 2126 is further configured to: detect (e.g., with input detecting unit 2132) a gesture at a location corresponding to the timer affordance; detect (e.g., with input detecting unit 2132) a gesture at a location corresponding to the shutter affordance; and in response to the detection of a gesture at a location corresponding to the timer affordance and to the detection of a gesture at a location corresponding to the shutter affordance: transmit (e.g., with transmitting unit 2138) a requested image capture time with an image capture request, wherein the requested image capture time accounts for a timer setting associated with the timer affordance.

In some embodiments, the timer setting is one selected from a two-second timer setting and a ten-second timer setting.

In some embodiments, processing unit 2126 is further configured to: in response to the detection of a gesture at a location corresponding to the shutter affordance: enable (e.g., with display enabling unit 2130) display of a countdown to the image capture time.

In some embodiments, the remote camera user-interface comprises an image preview affordance, and processing unit 2126 is further configured to: detect (e.g., with input detecting unit 2132) a gesture at a location corresponding to the image preview affordance; and in response to the detection of a gesture at a location corresponding to the image preview affordance: enable (e.g., with display enabling unit 2130) display of one or more images of a photo album of the external device.

In some embodiments, the image preview affordance comprises a thumbnail of an image of the photo album of the external device.

In some embodiments, processing unit 2126 is further configured to: in accordance with a determination that electronic device 2100 is not wirelessly connected to the external device and in response to the detection of a gesture at a location corresponding to the camera affordance: enable (e.g., with display enabling unit 2130) display of a notification that the external device is not responsive to remote camera control.

In some embodiments, processing unit 2126 is further configured to: further in accordance with a determination that electronic device 2100 is not wirelessly connected to the external device and in response to the detection of a gesture at a location corresponding to the camera affordance: enable (e.g., with display enabling unit 2130) display of an image preview affordance; and detect (e.g., with input detecting unit 2132) a gesture at a location corresponding to the image preview affordance. Processing unit 2126 is further configured to: in response to the detection of a gesture at a location corresponding to the image preview affordance: enable (e.g., with display enabling unit 2130) display of one or more images of a photo album stored on electronic device 2100.

In some embodiments, detecting a gesture at a location corresponding to the camera affordance comprises detecting (e.g., with input detecting unit 2132) a contact on the camera affordance and detecting (e.g., with input detecting unit 2132) liftoff of the contact.

The operations described above with reference to FIG. 17 are, optionally, implemented by components depicted in FIGS. 1A-1B or FIG. 21. For example, displaying operation 1702, detecting operation 1704, and determining operation 1706 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs configured to be executed by one or more processors of an electronic device with a touch-sensitive display and a rotatable input mechanism, the one or more programs including instructions for:
    displaying a camera affordance on the touch-sensitive display;
    detecting a gesture at a location corresponding to the camera affordance;

determining whether the electronic device is wirelessly connected to an external device responsive to remote camera control;

in accordance with a determination that the electronic device is wirelessly connected to the external device and in response to the detection of a gesture at a location corresponding to the camera affordance:

displaying a remote camera user-interface on the touch-sensitive display;

receiving data representing an image feed from a camera of the external device; and displaying the image feed in the remote camera user-interface;

detecting movement of the rotatable input mechanism; and in response to the detection of movement of the rotatable input mechanism:

transmitting a focus setting selection to the external device.

2. The non-transitory computer readable storage medium of claim 1, wherein the remote camera user-interface comprises a shutter affordance, the one or more programs further including instructions for:

detecting a gesture at a location corresponding to the shutter affordance; and in response to the detection of a gesture at a location corresponding to the shutter affordance:

transmitting an image capture request to the external device, the image capture request associated with an image capture time; and transmitting the focus setting selection with the image capture request.

3. The non-transitory computer readable storage medium of claim 2, wherein the remote camera user-interface comprises a toggle affordance, the one or more programs further including instructions for:

detecting a gesture at a location corresponding to the toggle affordance; and in response to the detection of a gesture at a location corresponding to the toggle affordance:

changing an action associated with detecting movement of the rotatable input mechanism, wherein the action comprises one of resizing the display of the image feed in the remote camera user-interface and transmitting a focus setting selection to the external device.

4. The non-transitory computer readable storage medium of claim 1, the one or more programs further including instructions for:

detecting a gesture at a location corresponding to the display of the image feed; and in response to the detection of a gesture at a location corresponding to the display of the image feed:

transmitting a focus setting selection to the external device.

5. The non-transitory computer readable storage medium of claim 1, wherein the remote camera user-interface comprises a shutter affordance, the one or more programs further including instructions for:

detecting a gesture at a location corresponding to the shutter affordance; and in response to the detection of a gesture at a location corresponding to the shutter affordance:

transmitting an image capture request to the external device.

6. The non-transitory computer readable storage medium of claim 1, wherein the remote camera user-interface comprises a shutter affordance, the one or more programs further including instructions for:

detecting a gesture at a location corresponding to the shutter affordance; and in response to the detection of a gesture at a location corresponding to the shutter affordance:

transmitting an image capture request to the external device, the image capture request associated with an image capture time; and ending the display of the image feed before the image capture time.

7. The non-transitory computer readable storage medium of claim 6, wherein the image capture request comprises a requested image capture time.

8. The non-transitory computer readable storage medium of claim 7, the one or more programs further including instructions for:

further in accordance with a determination that the electronic device is not wirelessly connected to the external device and in response to the detection of a gesture at a location corresponding to the camera affordance:

displaying an image preview affordance; and detecting a gesture at a location corresponding to the image preview affordance; and in response to the detection of a gesture at a location corresponding to the image preview affordance:

displaying one or more images of a photo album stored on the electronic device.

9. The non-transitory computer readable storage medium of claim 6, wherein ending the display of the image feed occurs prior to transmitting the image capture request to the external device.

10. The non-transitory computer readable storage medium of claim 1, wherein the remote camera user-interface comprises a timer affordance and a shutter affordance, the one or more programs further including instructions for:

detecting a gesture at a location corresponding to the timer affordance;

detecting a gesture at a location corresponding to the shutter affordance; and in response to the detection of a gesture at a location corresponding to the timer affordance and to the detection of a gesture at a location corresponding to the shutter affordance:

delaying transmission of the image capture request.

11. The non-transitory computer readable storage medium of claim 1, wherein the remote camera user-interface comprises a flash affordance, the one or more programs further including instructions for:

detecting a gesture at a location corresponding to the flash affordance; and in response to the detection of a gesture at a location corresponding to the flash affordance:

transmitting a camera flash selection to the external device, wherein the camera flash selection comprises an auto/on/off setting of a camera flash of the external device.

12. The non-transitory computer readable storage medium of claim 10, the one or more programs further including instructions for:

in response to the detection of a gesture at a location corresponding to the shutter affordance:

displaying a count-down to the image capture time.

13. The non-transitory computer readable storage medium of claim 12, wherein delaying transmission of the image capture request comprises delaying the transmission by one selected from a two-second delay and a ten-second delay.

14. The non-transitory computer readable storage medium of claim 1, wherein the remote camera user-interface comprises a timer affordance and a shutter affordance the one or more programs further including instructions for:
   detecting a gesture at a location corresponding to the timer affordance;
   detecting a gesture at a location corresponding to the shutter affordance; and
   in response to the detection of a gesture at a location corresponding to the timer affordance and to the detection of a gesture at a location corresponding to the shutter affordance:
      transmitting a requested image capture time with an image capture request, wherein the requested image capture time accounts for a timer setting associated with the timer affordance.

15. The non-transitory computer readable storage medium of claim 14, wherein the timer setting is one selected from a two-second timer setting and a ten-second timer setting.

16. The non-transitory computer readable storage medium of claim 1, wherein the remote camera user-interface comprises an image preview affordance, the one or more programs further including instructions for:
   detecting a gesture at a location corresponding to the image preview affordance; and
   in response to the detection of a gesture at a location corresponding to the image preview affordance:
      displaying one or more images of a photo album of the external device.

17. The non-transitory computer readable storage medium of claim 16, wherein the image preview affordance comprises a thumbnail of an image of the photo album of the external device.

18. The non-transitory computer readable storage medium of claim 1, the one or more programs further including instructions for:
   in accordance with a determination that the electronic device is not wirelessly connected to the external device and in response to the detection of a gesture at a location corresponding to the camera affordance:
      displaying a notification that the external device is not responsive to remote camera control.

19. The non-transitory computer readable storage medium of claim 1, wherein detecting a gesture at a location corresponding to the camera affordance comprises detecting a contact on the camera affordance and detecting liftoff of the contact.

20. An electronic device, comprising:
   a touch-sensitive display;
   a rotatable input mechanism;
   one or more processors; and
   memory storing one or more programs configured to be executed by the one or more processors, the one or more programs including instructions for:
      displaying a camera affordance on the touch-sensitive display;
      detecting a gesture at a location corresponding to the camera affordance;
      determining whether the electronic device is wirelessly connected to an external device responsive to remote camera control;
      in accordance with a determination that the electronic device is wirelessly connected to the external device and in response to the detection of a gesture at a location corresponding to the camera affordance:
         displaying a remote camera user-interface on the touch-sensitive display;
         receiving data representing an image feed from a camera of the external device; and
         displaying the image feed in the remote camera user-interface;
      detecting movement of the rotatable input mechanism; and
      in response to the detection of movement of the rotatable input mechanism:
         transmitting a focus setting selection to the external device.

21. The electronic device of claim 20, wherein the remote camera user-interface comprises a shutter affordance, the one or more programs further including instructions for:
   detecting a gesture at a location corresponding to the shutter affordance; and
   in response to the detection of a gesture at a location corresponding to the shutter affordance:
      transmitting an image capture request to the external device, the image capture request associated with an image capture time; and
      transmitting the focus setting selection with the image capture request.

22. The electronic device of claim 21, wherein the remote camera user-interface comprises a toggle affordance, the one or more programs further including instructions for:
   detecting a gesture at a location corresponding to the toggle affordance; and
   in response to the detection of a gesture at a location corresponding to the toggle affordance:
      changing an action associated with detecting movement of the rotatable input mechanism, wherein the action comprises one of resizing the display of the image feed in the remote camera user-interface and transmitting a focus setting selection to the external device.

23. The electronic device of claim 20, the one or more programs further including instructions for:
   detecting a gesture at a location corresponding to the display of the image feed; and
   in response to the detection of a gesture at a location corresponding to the display of the image feed:
      transmitting a focus setting selection to the external device.

24. The electronic device of claim 20, wherein the remote camera user-interface comprises a shutter affordance, the one or more programs further including instructions for:
   detecting a gesture at a location corresponding to the shutter affordance; and
   in response to the detection of a gesture at a location corresponding to the shutter affordance:
      transmitting an image capture request to the external device.

25. The electronic device of claim 20, wherein the remote camera user-interface comprises a shutter affordance, the one or more programs further including instructions for:
   detecting a gesture at a location corresponding to the shutter affordance; and
   in response to the detection of a gesture at a location corresponding to the shutter affordance:
      transmitting an image capture request to the external device, the image capture request associated with an image capture time; and
      ending the display of the image feed before the image capture time.

26. The electronic device of claim 25, wherein the image capture request comprises a requested image capture time.

27. The electronic device of claim 26, the one or more programs further including instructions for:
further in accordance with a determination that the electronic device is not wirelessly connected to the external device and in response to the detection of a gesture at a location corresponding to the camera affordance:
displaying an image preview affordance; and
detecting a gesture at a location corresponding to the image preview affordance; and
in response to the detection of a gesture at a location corresponding to the image preview affordance:
displaying one or more images of a photo album stored on the electronic device.

28. The electronic device of claim 25, wherein ending the display of the image feed occurs prior to transmitting the image capture request to the external device.

29. The electronic device of claim 25, the one or more programs further including instructions for:
in response to the detection of a gesture at a location corresponding to the shutter affordance:
displaying a count-down to the image capture time.

30. The electronic device of claim 20, wherein the remote camera user-interface comprises a flash affordance, the one or more programs further including instructions for:
detecting a gesture at a location corresponding to the flash affordance; and
in response to the detection of a gesture at a location corresponding to the flash affordance:
transmitting a camera flash selection to the external device, wherein the camera flash selection comprises an auto/on/off setting of a camera flash of the external device.

31. The electronic device of claim 20, wherein the remote camera user-interface comprises a timer affordance and a shutter affordance, the one or more programs further including instructions for:
detecting a gesture at a location corresponding to the timer affordance;
detecting a gesture at a location corresponding to the shutter affordance; and
in response to the detection of a gesture at a location corresponding to the timer affordance and to the detection of a gesture at a location corresponding to the shutter affordance:
delaying transmission of an image capture request.

32. The electronic device of claim 31, wherein delaying transmission of the image capture request comprises delaying the transmission by one selected from a two-second delay and a ten-second delay.

33. The electronic device of claim 20, wherein the remote camera user-interface comprises a timer affordance and a shutter affordance, the one or more programs further including instructions for:
detecting a gesture at a location corresponding to the timer affordance;
detecting a gesture at a location corresponding to the shutter affordance; and
in response to the detection of a gesture at a location corresponding to the timer affordance and to the detection of a gesture at a location corresponding to the shutter affordance:
transmitting a requested image capture time with an image capture request, wherein the requested image capture time accounts for a timer setting associated with the timer affordance.

34. The electronic device of claim 33, wherein the timer setting is one selected from a two-second timer setting and a ten-second timer setting.

35. The electronic device of claim 20, wherein the remote camera user-interface comprises an image preview affordance, the one or more programs further including instructions for:
detecting a gesture at a location corresponding to the image preview affordance; and
in response to the detection of a gesture at a location corresponding to the image preview affordance:
displaying one or more images of a photo album of the external device.

36. The electronic device of claim 35, wherein the image preview affordance comprises a thumbnail of an image of the photo album of the external device.

37. The electronic device of claim 20, the one or more programs further including instructions for:
in accordance with a determination that the electronic device is not wirelessly connected to the external device and in response to the detection of a gesture at a location corresponding to the camera affordance:
displaying a notification that the external device is not responsive to remote camera control.

38. The electronic device of claim 20, wherein detecting a gesture at a location corresponding to the camera affordance comprises detecting a contact on the camera affordance and detecting liftoff of the contact.

39. A method, comprising:
at an electronic device with a touch-sensitive display and a rotatable input mechanism:
displaying a camera affordance on the touch-sensitive display;
detecting a gesture at a location corresponding to the camera affordance;
determining whether the electronic device is wirelessly connected to an external device responsive to remote camera control;
in accordance with a determination that the electronic device is wirelessly connected to the external device and in response to the detection of a gesture at a location corresponding to the camera affordance:
displaying a remote camera user-interface on the touch-sensitive display;
receiving data representing an image feed from a camera of the external device; and
displaying the image feed in the remote camera user-interface;
detecting movement of the rotatable input mechanism; and
in response to the detection of movement of the rotatable input mechanism:
transmitting a focus setting selection to the external device.

40. The method of claim 39, wherein the remote camera user-interface comprises a shutter affordance, the method further comprising:
detecting a gesture at a location corresponding to the shutter affordance; and
in response to the detection of a gesture at a location corresponding to the shutter affordance:
transmitting an image capture request to the external device, the image capture request associated with an image capture time; and
transmitting the focus setting selection with the image capture request.

41. The method of claim 40, wherein the remote camera user-interface comprises a toggle affordance, the method further comprising:
  detecting a gesture at a location corresponding to the toggle affordance; and
  in response to the detection of a gesture at a location corresponding to the toggle affordance:
    changing an action associated with detecting movement of the rotatable input mechanism, wherein the action comprises one of resizing the display of the image feed in the remote camera user-interface and transmitting a focus setting selection to the external device.

42. The method of claim 39, further comprising:
  detecting a gesture at a location corresponding to the display of the image feed; and
  in response to the detection of a gesture at a location corresponding to the display of the image feed:
    transmitting a focus setting selection to the external device.

43. The method of claim 39, wherein the remote camera user-interface comprises a shutter affordance, the method further comprising:
  detecting a gesture at a location corresponding to the shutter affordance; and
  in response to the detection of a gesture at a location corresponding to the shutter affordance:
    transmitting an image capture request to the external device.

44. The method of claim 39, wherein the remote camera user-interface comprises a shutter affordance, the method further comprising:
  detecting a gesture at a location corresponding to the shutter affordance; and
  in response to the detection of a gesture at a location corresponding to the shutter affordance:
    transmitting an image capture request to the external device, the image capture request associated with an image capture time; and
    ending the display of the image feed before the image capture time.

45. The method of claim 44, wherein the image capture request comprises a requested image capture time.

46. The method of claim 45, further comprising:
  further in accordance with a determination that the electronic device is not wirelessly connected to the external device and in response to the detection of a gesture at a location corresponding to the camera affordance:
    displaying an image preview affordance; and
    detecting a gesture at a location corresponding to the image preview affordance; and
  in response to the detection of a gesture at a location corresponding to the image preview affordance:
    displaying one or more images of a photo album stored on the electronic device.

47. The method of claim 44, wherein ending the display of the image feed occurs prior to transmitting the image capture request to the external device.

48. The method of claim 44, further comprising:
  in response to the detection of a gesture at a location corresponding to the shutter affordance:
    displaying a count-down to the image capture time.

49. The method of claim 39, wherein the remote camera user-interface comprises a flash affordance, the method further comprising:
  detecting a gesture at a location corresponding to the flash affordance; and
  in response to the detection of a gesture at a location corresponding to the flash affordance:
    transmitting a camera flash selection to the external device, wherein the camera flash selection comprises an auto/on/off setting of a camera flash of the external device.

50. The method of claim 39, wherein the remote camera user-interface comprises a timer affordance and a shutter affordance, the method further comprising:
  detecting a gesture at a location corresponding to the timer affordance;
  detecting a gesture at a location corresponding to the shutter affordance; and
  in response to the detection of a gesture at a location corresponding to the timer affordance and to the detection of a gesture at a location corresponding to the shutter affordance:
    delaying transmission of an image capture request.

51. The method of claim 50, wherein delaying transmission of the image capture request comprises delaying the transmission by one selected from a two-second delay and a ten-second delay.

52. The method of claim 39, wherein the remote camera user-interface comprises a timer affordance and a shutter affordance, the method further comprising:
  detecting a gesture at a location corresponding to the timer affordance;
  detecting a gesture at a location corresponding to the shutter affordance; and
  in response to the detection of a gesture at a location corresponding to the timer affordance and to the detection of a gesture at a location corresponding to the shutter affordance:
    transmitting a requested image capture time with an image capture request, wherein the requested image capture time accounts for a timer setting associated with the timer affordance.

53. The method of claim 52, wherein the timer setting is one selected from a two-second timer setting and a ten-second timer setting.

54. The method of claim 39, wherein the remote camera user-interface comprises an image preview affordance, the method further comprising:
  detecting a gesture at a location corresponding to the image preview affordance; and
  in response to the detection of a gesture at a location corresponding to the image preview affordance:
    displaying one or more images of a photo album of the external device.

55. The method of claim 54, wherein the image preview affordance comprises a thumbnail of an image of the photo album of the external device.

56. The method of claim 39, further comprising:
  in accordance with a determination that the electronic device is not wirelessly connected to the external device and in response to the detection of a gesture at a location corresponding to the camera affordance:
    displaying a notification that the external device is not responsive to remote camera control.

57. The method of claim 39, wherein detecting a gesture at a location corresponding to the camera affordance comprises detecting a contact on the camera affordance and detecting liftoff of the contact.

* * * * *

UNITED STATES PATENT AND TRADEMARK OFFICE
CERTIFICATE OF CORRECTION

PATENT NO. : 10,200,587 B2
APPLICATION NO. : 15/975581
DATED : February 5, 2019
INVENTOR(S) : Alan C. Dye et al.

It is certified that error appears in the above-identified patent and that said Letters Patent is hereby corrected as shown below:

In the Claims

In Claim 13, Column 54, Line 67, after "of", delete "claim 12," and add --claim 10,--.

Signed and Sealed this
Sixteenth Day of July, 2019

Andrei Iancu
*Director of the United States Patent and Trademark Office*